United States Patent
Chavva et al.

(10) Patent No.: US 10,931,348 B2
(45) Date of Patent: Feb. 23, 2021

(54) METHOD AND SYSTEM FOR SENSOR-BASED BEAM MANAGEMENT BY USER EQUIPMENT

(71) Applicant: Samsung Electronics Co., Ltd., Gyeonggi-do (KR)

(72) Inventors: Ashok Kumar Reddy Chavva, Bangalore (IN); Shubham Khunteta, Bangalore (IN); Yunas Rashid, Bangalore (IN); Chaiman Lim, Gyeonggi-do (KR); Youngpo Lee, Gyeonggi-do (KR); Jinwoo Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 27 days.

(21) Appl. No.: 16/376,720

(22) Filed: Apr. 5, 2019

(65) Prior Publication Data

US 2019/0238202 A1    Aug. 1, 2019

(30) Foreign Application Priority Data

Apr. 5, 2008  (IN) .............................. 201841012895
Oct. 1, 2018  (IN) .............................. 201841037154
Apr. 3, 2019  (IN) .............................. 201841012895

(51) Int. Cl.
*H04B 7/06*       (2006.01)
*H04W 24/08*   (2009.01)
(Continued)

(52) U.S. Cl.
CPC .......... *H04B 7/0617* (2013.01); *H04W 24/08* (2013.01); *H04L 67/12* (2013.01); *H04W 16/28* (2013.01); *H04W 88/02* (2013.01)

(58) Field of Classification Search
CPC .... H04B 7/0617; H04W 24/08; H04W 16/28; H04W 88/02; H04L 67/12
See application file for complete search history.

(56) References Cited

U.S. PATENT DOCUMENTS

2001/0014605 A1*  8/2001  Lindvall ............ H04B 7/18545
                                                                              455/427
2004/0213187 A1* 10/2004  Fujil .................... H04B 7/0408
                                                                              370/335
(Continued)

FOREIGN PATENT DOCUMENTS

WO    WO 2017/213895    12/2017
WO    WO 2018/009462     1/2018
WO    WO 2018/017840     1/2018

OTHER PUBLICATIONS

Samsung, "The Impact of Beam Sweeping on RRM Measurement", R2-1709606, 3GPP TSG RAN WG2 #99, Aug. 21-25, 2017, 4 pages.

(Continued)

*Primary Examiner* — Duc C Ho
(74) *Attorney, Agent, or Firm* — The Farrell Law Firm, P.C.

(57) ABSTRACT

A method and system are provided for sensor-based beam management by user equipment (UE). The method includes obtaining, by the UE, a reference beam pair and a first set of neighbor beam pairs in a first reception direction for connecting with a network; determining, by the UE, a change in the first reception direction, based on sensor data; identifying, by the UE, a second set of neighbor beam pairs in the changed first reception direction; measuring, by the UE, a plurality of beam parameters for neighbor beam pairs in the second set of neighbor beam pairs; determining, by the UE, an optimal beam pair from the identified second set of neighbor beam pairs based on the plurality of measured beam parameters; and configuring, by the UE, an optimal beam pair for connecting with the network.

28 Claims, 27 Drawing Sheets

(51) Int. Cl.
    *H04L 29/08*    (2006.01)
    *H04W 88/02*    (2009.01)
    *H04W 16/28*    (2009.01)

(56) References Cited

U.S. PATENT DOCUMENTS

2017/0006593 A1    1/2017    Liu
2017/0223552 A1    8/2017    Roy et al.
2018/0062717 A1    3/2018    Mok et al.
2018/0191422 A1    7/2018    Xia et al.

OTHER PUBLICATIONS

ASUSTeK, "Discussion on UL Beam Management", R1-1717897, 3GPP TSG RAN WG1 Meeting 90bis, Oct. 9-13, 2017, 4 pages.
International Search Report dated Jul. 10, 2019 issued in counterpart application No. PCT/KR2019/004115, 7 pages.
Huawei, HiSilicon, "UL Beam Management", R1-1712223, 3GPP TSG RAN WG1 Meeting #90, Aug. 21-25, 2017, 4 pages.
John S. Seybold, "Introduction to RF Propagation", XP055273845, Sep. 16, 2005, 349 pages.
European Search Report dated Dec. 10, 2020 issued in counterpart application No. 19782128.2-1220, 15 pages.

\* cited by examiner

|  | Azimuth | | | | |
|---|---|---|---|---|---|
| | -40 | -20 | 0 | 20 | 40 |
| Zenith  -40 | [23 | 19 | 8 | 16 | 24 |
| -20 | 15 | 11 | 4 | 12 | 20 |
| 0 | 7 | 3 | 0 | 1 | 5 |
| 20 | 18 | 10 | 2 | 9 | 13 |
| 40 | 22 | 14 | 6 | 17 | 21] |

FIG.25

| UE (100) Rx beam id | BS (200) id (gNbid) | BS (200) Tx beam id | |
|---|---|---|---|
| $r_1$ | $g_1$ | $t_{1g1}$ | ← Neighbor beams of top 'K' beams, here K=2. |
| $r_2$ | $g_2$ | $t_{2g2}$ | |
| $r_3$ | $g_3$ | $t_{3g3}$ | |
| $r_4$ | $g_4$ | $t_{4g4}$ | ← Neighbor beams of Rx beam corresponds to orientation change |
| ...... | | | |
| $r_M$ | $g_M$ | $t_{MgM}$ | |

Orientation Change

FIG.26

– 1 –
METHOD AND SYSTEM FOR SENSOR-BASED BEAM MANAGEMENT BY USER EQUIPMENT

CROSS REFERENCE TO RELATED APPLICATION(S)

This application is based on and claims priority under 35 U.S.C. § 119 to Indian Provisional Patent Application Nos. 201841012895 (PS) and 201841037154 (PS), which were filed in the Indian Patent Office on Apr. 5, 2018 and Oct. 1, 2018, respectively, and to Indian Patent Application No. 201841012895 (CS), which was filed in the Indian Patent Office on Apr. 3, 2019, the entire disclosure of each of which is incorporated herein by reference.

BACKGROUND

1. Field

The present disclosure relates generally to a wireless communication system, and more particularly, to a method and system for sensor-based beam management by a user equipment (UE).

2. Description of Related Art

To meet the increasing demand for higher throughputs, cellular communication technology is driving towards millimeter Wave (mmWave) band. However, communication in mmWave bands is prone to severe propagation loss and other propagation effects, such as attenuation from atmospheric gasses and precipitation, blockage, scattering, and diffraction effects.

Beamforming with antenna arrays helps to address these challenges. The smaller wavelength at mmWave allows the use of an antenna array with a large number of antenna elements at a UE. Large antenna arrays result in higher array gain with narrow beams, which in turn helps in recovering from excessive propagation loss at mmWave bands.

However, the use of narrow beams requires an accurate alignment of transmitter and receiver beams.

In cellular systems with mobile devices, frequent measurements of transmit beams at each of the receive beams are required to choose a transmit-receive beam pair for communication, adaptive modulation, and rate control. Accordingly, a base station (BS) sends out periodic reference signals on all transmit beams to help a UE estimate a channel gain on each beam pair. For example, $3^{rd}$ generation partnership project (3GPP) new radio (NR) uses periodic transmission of synchronization signal blocks (SSB) and channel state information (CSI)-reference signals for beam selection and rate adaptation. However, with narrow beams at both the BS and the UE resulting in large beam pairs, the time required to select the best beam pair can be significant.

With $5^{th}$ generation (5G) handheld devices that are expected to handle free movement, there is a need for frequent realignment of transmit and receive beam pairs to sustain good links. Realignment of beams pair in typical mmWave systems is performed with the help of beam measurements that periodically sweep through all possible beam pairs and select the best pair. However, this beam sweep procedure takes significant time and is proportional to a number of beam pairs (product of a number of transmit and receive beams). A longer beam sweep duration will result in using inappropriate beams for receive and transmit operations in typical use cases of handhelds.

SUMMARY

The present disclosure has been made to address at least the disadvantages described above and to provide at least the advantages described below.

An aspect of the present disclosure is to provide a method and system for sensor-based beam management by a user equipment.

Another aspect of the present disclosure is to obtain a reference beam pair and a first set of neighbor beam pairs in a first reception direction for connecting with a network.

Another aspect of the present disclosure is to determine a change in a reception direction of the UE based on sensor data.

Another aspect of the present disclosure is to identify a second set of neighbor beam pairs in the changed reception direction.

Another aspect of the present disclosure is to measure a plurality of beam parameters for neighbor beam pairs in a second set of neighbor beam pairs.

Another aspect of the present disclosure is to determine an optimal beam pair from an identified second set of neighbor beam pairs based on a plurality of measured beam parameters.

Another aspect of the present disclosure is to configure an optimal beam pair for connecting with a network.

Another aspect of the present disclosure is to determine whether a Signal-to-Noise Ratio (SNR) of an optimal beam pair is below a first SNR threshold and is above a second SNR threshold.

Another aspect of the present disclosure is to add new neighboring beam pairs to a second set of neighbor beam pairs, in response to determining that the SNR of an optimal beam pair is below a first SNR threshold and is above a second SNR threshold.

Another aspect of the present disclosure is to switch a reference beam pair to a new reference beam pair by performing a beam sweep operation, in response to determining that an SNR of an optimal beam pair is below a second SNR threshold, wherein a second SNR threshold lower than a first SNR threshold.

In accordance with an aspect of the present disclosure, a method is provided for sensor-based beam management by a UE. The method includes obtaining, by the UE, a reference beam pair and a first set of neighbor beam pairs in a first reception direction for connecting with a network; determining, by the UE, a change in the first reception direction, based on sensor data; identifying, by the UE, a second set of neighbor beam pairs in the changed first reception direction; measuring, by the UE, a plurality of beam parameters for neighbor beam pairs in the second set of neighbor beam pairs; determining, by the UE, an optimal beam pair from the identified second set of neighbor beam pairs based on the plurality of measured beam parameters; and configuring, by the UE, an optimal beam pair for connecting with the network.

In accordance with another aspect of the present disclosure, a UE is provided for sensor-based beam management. The UE includes a memory; and a processor, operationally coupled to the memory, configured to obtain a reference beam pair and a first set of neighbor beam pairs in a first reception direction for connecting with a network; determine a change in the first reception direction of the UE based on sensor data; identify a second set of neighbor beam pairs in the changed first reception direction; measure a plurality of beam parameters for neighbor beam pairs in the second set of neighbor beam pairs; determine an optimal beam pair from the identified second set of neighbor beam pairs based on the plurality of measured beam parameters; and configure an optimal beam pair for connecting with the network.

BRIEF DESCRIPTION OF DRAWINGS

The above and other aspects, features and advantages of certain embodiments of the disclosure will be more apparent from the following detailed description taken in conjunction with the accompanying drawings, in which:

FIG. 25 illustrates beam mapping of 25 (N) beams, according to an embodiment; and FIG. 26 illustrates sensor based beam tracking, according to an embodiment.

DETAILED DESCRIPTION

Figure 1:
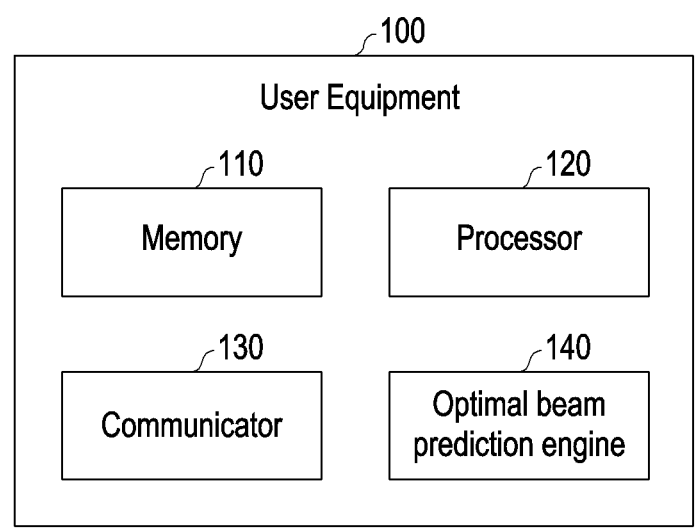
FIG. 1 illustrates a user equipment, according to an embodiment.

Various embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure.

In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

When an element (e.g., a first element) is "(operatively or communicatively) coupled with/to" or "connected to" another element (e.g., a second element), the first element may be directly coupled with/to the second element, or there may be an intervening element (e.g., a third element) between the first element and the second element. However, when the first element is "directly coupled with/to" or "directly connected to" the second element, there is no intervening element between the first element and the second element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

According to an embodiment, a method is provided for sensor-based beam management by a UE. The method includes obtaining, by the UE, a reference beam pair and a first set of neighbor beam pairs in a first reception direction for connecting with a network; determining, by the UE, a change in the first reception direction of the UE based on sensor data; and identifying, by the UE, a second set of neighbor beam pairs in the changed reception direction. The method also includes measuring, by the UE, a plurality of beam parameters for neighbor beam pairs in the second set of neighbor beam pairs; determining, by the UE, an optimal beam pair from the identified second set of neighbor beam pairs based on the plurality of measured beam parameters; and configuring, by the UE, the optimal beam pair for connecting with the network.

FIG. 1 illustrates a UE, according to an embodiment.

Referring to FIG. 1, a UE 100, e.g., a smartphone, a tablet, etc., includes a memory 110, a processor 120, a communicator 130, and an optimal beam prediction engine 140.

The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

The memory 110 may, in some examples, be considered a non-transitory storage medium. Herein, the term "non-transitory" may indicate that the storage medium is not embodied in a carrier wave or a propagated signal. However, the term "non-transitory" should not be interpreted that the memory 110 is non-movable.

The memory 110 can be configured to store large amounts of information.

A non-transitory storage medium may store data that can, over time, change (e.g., in Random Access Memory (RAM) or cache).

The memory 110 can be an internal storage unit or an external storage unit of the UE 100, a cloud storage, or any other type of external storage.

The processor 120 communicates with the memory 110, the communicator 130, and the optimal beam prediction engine 140. The processor 120 executes instructions stored in the memory 110 and to perform various processes.

The communicator 130 communicates internally between internal hardware components and with external devices via one or more networks.

The optimal beam prediction engine 140 obtains a reference beam pair and a first set of neighbor beam pairs in a first reception direction for connecting with a network. The optimal beam prediction engine 140 determines a change in the reception direction of the UE 100 based on sensor data. The optimal beam prediction engine 140 identifies a second set of neighbor beam pairs in the changed reception direction. The optimal beam prediction engine 140 measures a plurality of beam parameters for neighbor beam pairs in the second set of neighbor beam pairs, and determines an optimal beam pair from the identified second set of neighbor beam pairs based on the plurality of measured beam parameters.

The optimal beam prediction engine 140 configures the optimal beam pair for connecting with the network. The optimal beam prediction engine 140 determines whether an SNR of the optimal beam pair is below a first SNR threshold and is above a second SNR threshold. The optimal beam prediction engine 140 adds new neighboring beam pairs to the second set of neighbor beam pairs, in response to determining that the SNR of the optimal beam pair is below the first SNR threshold and is above the second SNR threshold, or switches the reference beam pair to a new reference beam pair by performing a beam sweep operation, in response to determining that the SNR of the optimal beam pair is below the second SNR threshold. The second SNR threshold is lower than the first SNR threshold.

Although the FIG. 1 illustrates various hardware components of the UE 100, the present disclosure is not limited thereto. For example, the UE 100 may include fewer or more components.

Further, the names of the components in FIG. 1 are used only for illustrative purposes and do not limit the scope of the disclosure.

Additionally, one or more components can be combined together to perform same or substantially similar function for sensor-based beam management.

Figure 2A:
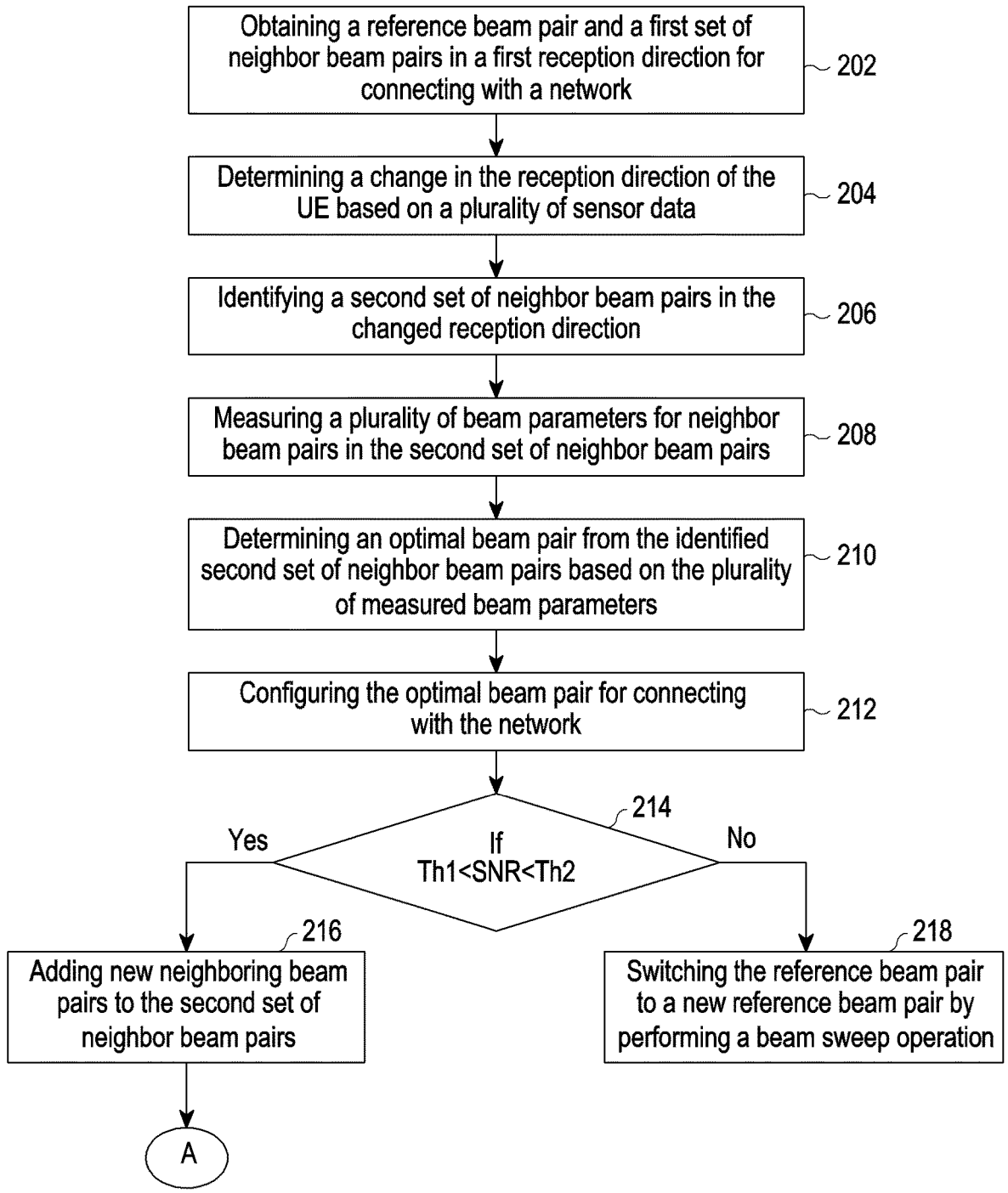
FIGS. 2A and 2B are flow charts illustrating a method for sensor-based beam management by a UE, according to an embodiment.
Figure 2B:
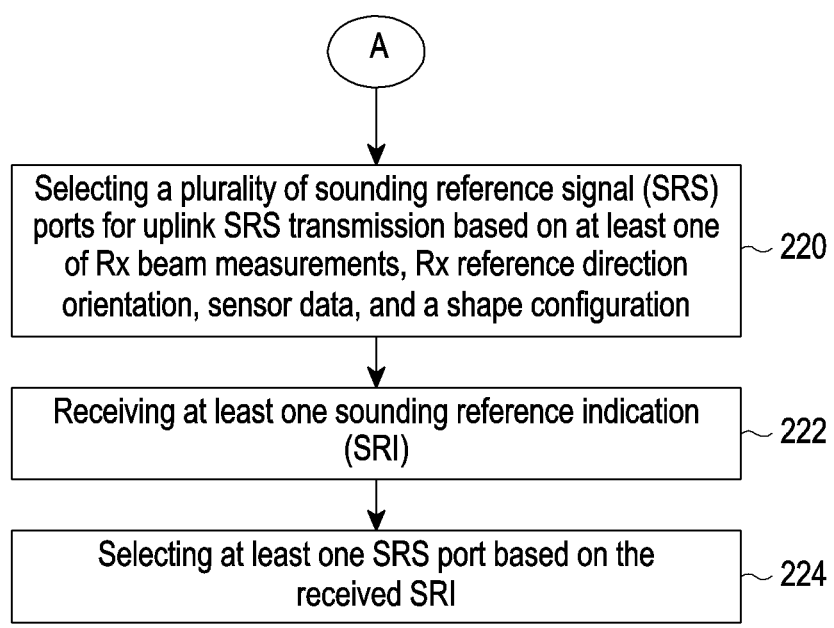

FIGS. 2A and 2B are flow charts illustrating a method for sensor-based beam management by a UE, according to an embodiment. For example, the method of FIGS. 2A and 2B may be performed by the UE 100 illustrated in FIG. 1.

Referring to FIG. 2A, at step 202, the UE obtains a reference beam pair and a first set of neighbor beam pairs in a first reception direction for connecting with a network.

At step 204, the UE determines a change in the first reception direction of the UE based on sensor data.

At step 206, the UE identifies a second set of neighbor beam pairs in the changed first reception direction.

At step 208, the UE measures a plurality of beam parameters for neighbor beam pairs in the second set of neighbor beam pairs.

At step 210, the UE determines an optimal beam pair from the identified second set of neighbor beam pairs based on the plurality of measured beam parameters.

At step 212, the UE configures the optimal beam pair for connecting with the network.

At step 214, the determines if an SNR of the optimal beam pair is between a first SNR threshold and a second SNR threshold, i.e., greater than the second SNR threshold but less than the first SNR threshold. The second SNR threshold is less than the first SNR threshold.

If the SNR is between the first SNR threshold and the second SNR threshold, the UE adds new neighboring beam pairs to the second set of neighbor beam pairs, at step 216.

However, if the SNR is not between the first SNR threshold and the second SNR threshold, the UE switches the reference beam pair to a new reference beam pair by performing a beam sweep operation, at step 218.

Referring to FIG. 2B, at step 220, the UE selects a plurality of sounding reference signal (SRS) ports for uplink SRS transmission based on at least one of reception (Rx) beam measurements, Rx reference direction orientation, sensor data, and a shape configuration.

At step 222, the UE receives at least one sounding reference indication (SRI).

At step 224, the UE selects at least one SRS port based on the received SRI.

Figure 3:
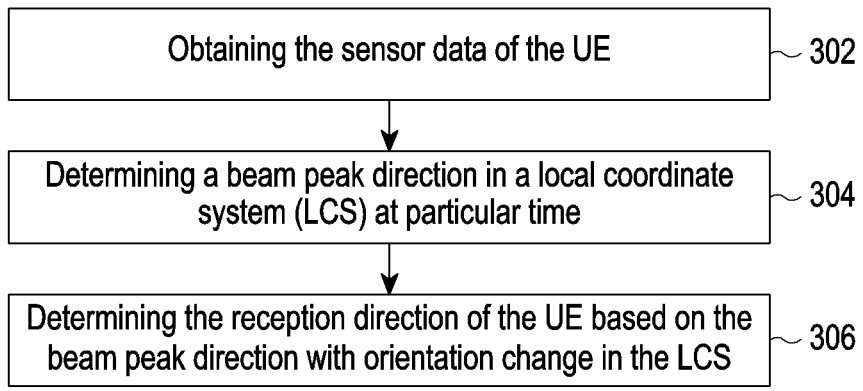
FIG. 3 is a flow chart illustrating a method for determining a reception direction of UE based on sensor data of a UE, according to an embodiment.

FIG. 3 is a flow chart illustrating a method for determining a reception direction of a UE based on sensor data of the UE, according to an embodiment. For example, the method of FIG. 3 may be performed by the UE 100 illustrated in FIG. 1.

Referring to FIG. 3, at step 302, the UE obtains sensor data.

At step 304, the UE determines a beam peak direction in an LCS at a particular time.

At step 306, the UE determines a reception direction of the UE based on the beam peak direction with orientation change in the LCS.

Figure 4:
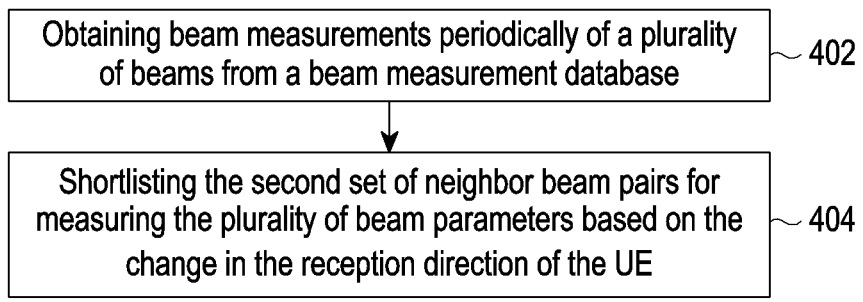
FIG. 4 is a flow chart illustrating a method for identifying a second set of neighbor beam pairs in a changed reception direction, according to an embodiment.

FIG. 4 is a flow chart illustrating a method for identifying a second set of neighbor beam pairs in a changed reception direction, according to an embodiment. For example, the method of FIG. 4 may be performed by the UE 100 illustrated in FIG. 1.

Referring to FIG. 4, at step 402, the UE periodically obtains beam measurements of a plurality of beams from a beam measurement database.

At step 404, the UE shortlists a second set of neighbor beam pairs for measuring the plurality of beam parameters based on a change in a reception direction of the UE. That is, the UE identifies the second set of neighbor beam pairs as likely candidate for use in measuring the plurality of beam parameters based on the change in the reception direction of the UE.

Figure 5:
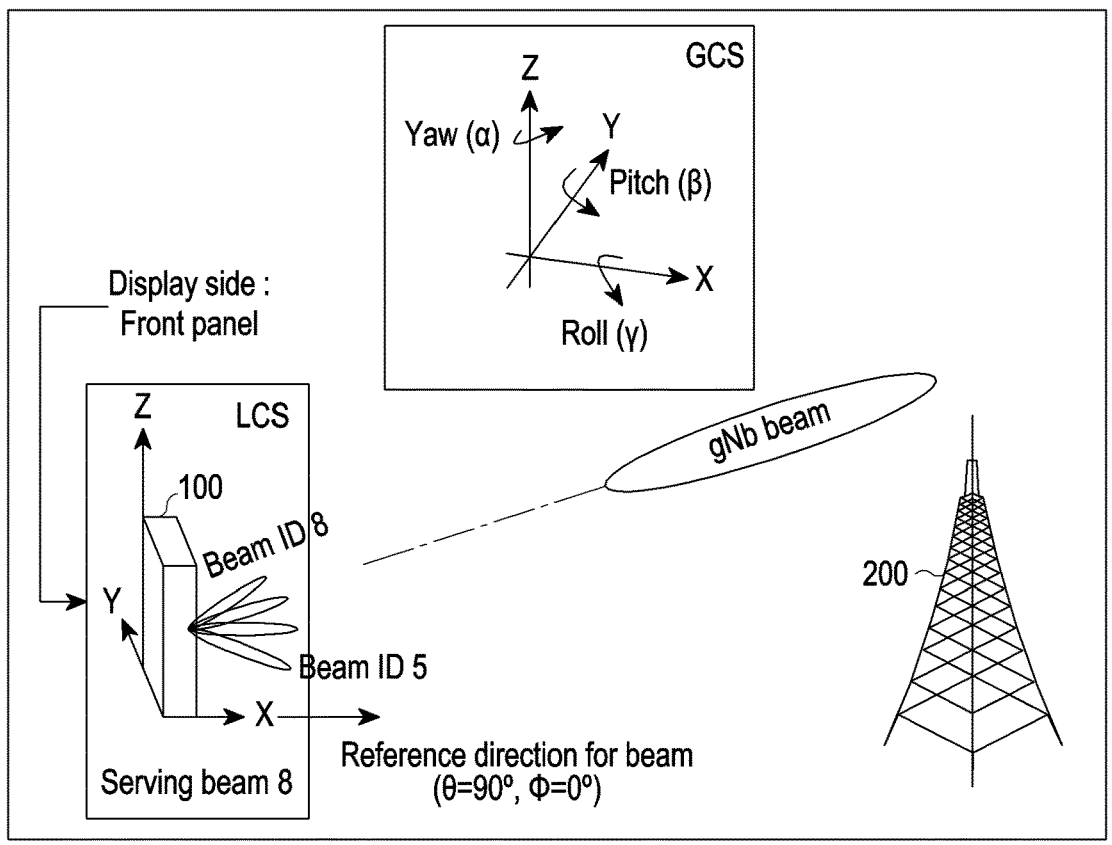
FIG. 5 illustrates a system model including a UE and a BS with global coordinate system (GCS) and local coordinate system (LCS) reference frames, according to an embodiment.

FIG. 5 illustrates a system model including a UE and a BS with GCS and LCS reference frames, according to an embodiment.

Referring to FIG. 5, an mmWave cellular system is provided with a BS (gNB) 200 equipped with beamforming capable multi-antenna system with $B_{BS}$ beams for both transmission and reception. The UE 100 is equipped with an antenna system that is capable of forming $B_{UE}$ beams. Both the BS 200 and the UE 100 may be placed in a GCS, as illustrated in FIG. 5.

The UE 100 and its beams are identified in the UE's own LCS. Orientation of the UE 100 is described by a tuple ($\alpha$, $\beta$, $\gamma$) relative to the GCS. Any direction vector in the LCS can be transformed to the GCS using the transformations described in 3GPP. In this setup, the UE 100 orientation can be changed at a constant rate in $\alpha$ or $\beta$ or $\gamma$ directions or any combination of these directions.

Figure 6:
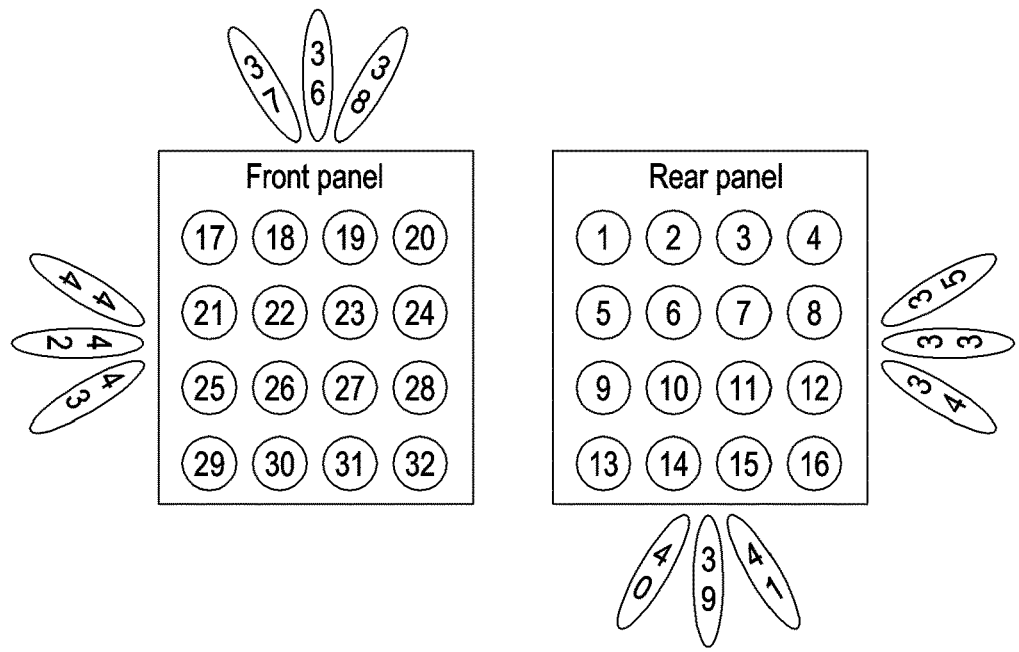
FIG. 6 illustrates beam positions for modelling a UE device beam structure on a system level simulation (SLS), according to an embodiment.

FIG. 6 illustrates beam positions for modelling a UE beam structure on SLS (i.e., front and rear of the UE), according to an embodiment.

Referring to FIG. 6, the beam layout includes 44 beams covering azimuth and elevation directions (as will be described in Table 1 below). Antenna panels are placed on back, front, and side panels of the UE to cover all directions of signal arrival in various device positions and holding scenarios. For simplicity, it is assumed that a BS transmit beam is fixed, while the UE receive beam may change based on channel conditions and orientation changes of the UE.

A beam direction for an $i^{th}$ beam relative to a device LCS may be denoted by $b'_i=[\theta'_i, \phi'_i]$, where $\theta'_i$ and $\phi'_i$ represent a main lobe peak direction of a beam in the LCS. A beam pattern of the $i^{th}$ beam may be represented by $G'_i(\theta', \phi')$.

It is assumed that a beam peak direction and gain pattern of each beam is known a priori. The UE orientation at given time t is given by $O(t)=[\alpha\ \beta\ \gamma]$ relative to the GCS.

Based on the device orientation in the GCS, a beam gain pattern of each beam $b_i$ in the GCS can be computed using the LCS to GCS transformation. The beam gain pattern for a beam i in the GCS with orientation O (t) may be $G_i(\theta, \phi, t)$. Orientation change may be used every $T_{update}$. A channel coefficient $h_i(t)$ between the BS transmitter beam and the UE receive beam $b_i$ captures the effect of the device orientation changing with time.

According to embodiment, an SLS setup is used with a channel model to understand UE behavior in various orientation change conditions at mmWave bands. To isolate these effects, the system use a single BS (or gNB) and the UE. The UE is equipped with more than one multiple antenna array capable of forming 44 beams.

Beam numbering is as illustrated in FIG. 6 and specific beam direction in the LCS with azimuth (Az), elevation (El) are provided in Table 1 below per received beam.

Elevation and azimuth values in Table 1 are relative to a top view of a rear panel $\theta=90°$ and $\phi=0°$. The system uses Taylor weighting for rectangular array with an even number of elements for obtaining a gain pattern for each beam.

Placement of a peak direction of each beam at the UE in the LCS azimuth and elevation, maximizes the coverage in all radial directions.

A channel for each receiving beam from a given BS transmit beam may be modeled as described in the system model illustrated in FIG. 5. The channel model assumes an urban micro (UMi) scenario. A center frequency is set to 28 GHz, a height of the BS is set to 10 m, and the UE is assumed to be in a line of sight (LOS) condition with Rician K factor of 10. The system assumes a UE velocity of 2 m/sec that introduces time variation in the channel.

Figure 7:
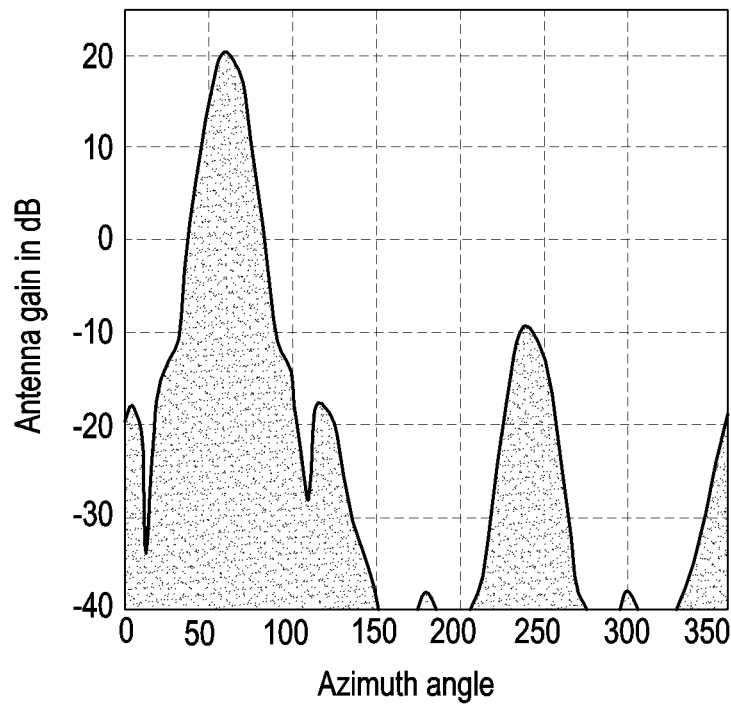
FIG. 7 illustrates a UE antenna gain pattern for receive beam index 8 in an azimuth LCS, according to an embodiment.

An antenna panel at the UE is assumed to be (M, N, P)=(8, 4, 1) with beam pattern gain in azimuth and an elevation of the UE LCS as illustrated in FIG. 7.

Three dimensional (3D) distance between the BS and the UE is set to 87 m for this simulation.

An antenna panel at the BS is assumed to be (M, N, P)=(32, 8, 1). The system further assumes one of the BS transmit beam is serving the UE over a complete simulation duration, while receive beams are adapted by choosing the best beam based on received power of each receive beam. When the BS transmit beam and the UE receive beam are aligned, the system observes a 27 dB average SNR at the UE.

TABLE 1

UE beam directions (directions of beam peaks) relative to (90, 0) in the LCS

| Rear panel | | | Front panel | | | Side panels | | |
|---|---|---|---|---|---|---|---|---|
| Idx | El | Az | Idx | El | Az | Idx | El | Az |
| 1 | 60° | −60° | 17 | 60° | −120° | 33 | 0° | 90° |
| 2 | 60° | −20° | 18 | 60° | −160° | 34 | −30° | 90° |
| 3 | 60° | 20° | 19 | 60° | 160° | 35 | 30° | 90° |
| 4 | 60° | 60° | 20 | 60° | 120° | 36 | 90° | 0° |
| 5 | 20° | −60° | 21 | 20° | −120° | 37 | 90° | −30° |
| 6 | 20° | −20° | 22 | 20° | −160° | 38 | 90° | 30° |
| 7 | 20° | 20° | 23 | 20° | 160° | 39 | −90° | 0° |
| 8 | 20° | 60° | 24 | 20° | 120° | 40 | −90° | −30° |
| 9 | −20° | −60° | 25 | −20° | −120° | 41 | −90° | 30° |
| 10 | −20° | −20° | 26 | −20° | −160° | 42 | 0° | −90° |
| 11 | −20° | 20° | 27 | −20° | 160° | 43 | −30° | −90° |
| 12 | −20° | 60° | 28 | −20° | 120° | 44 | 30° | −90° |
| 13 | −60° | −60° | 29 | −60° | −120° | — | — | — |
| 14 | −60° | −20° | 30 | −60° | −160° | — | — | — |
| 15 | −60° | 20° | 31 | −60° | 160° | — | — | — |
| 16 | −60° | 60° | 32 | −60° | 120° | — | — | — |

The system assumes an instantaneous adaptive modulation and coding rate for the downlink. A receiver is assumed to have knowledge of a channel gain for demodulation and decoding purposes. The system also assumes single layer transmission for capacity and spectral efficiency computations. With these assumptions, the system computes the average rate of the UE, averaged over a time duration of 20 sec (2000 samples separated by 10 ms). This average rate of the UE is compared in different scenarios to show the gain with the proposed measurement selection set scheme. The simulation results and lab setup for an algorithm (i.e., a sensor based algorithm) will be describe below with reference to FIGS. 13 to 18.

FIG. 7 illustrates a UE antenna gain pattern for a receive beam index 8 in an azimuth LCS, according to an embodiment.

Referring to FIG. 7, the system uses a beam gain pattern based on a two-dimensional antenna array with 8×4 (32) antenna elements, with amplitude and phase coefficients applied across all the elements for changing the direction of the beam and shaping the beam pattern. Longer side of the antenna array is aligned in the azimuth direction. The system assumes fixed beam direction for each beam, which implies the coefficients are fixed per beam direction and are chosen based on the selected beam index.

Figure 8A:
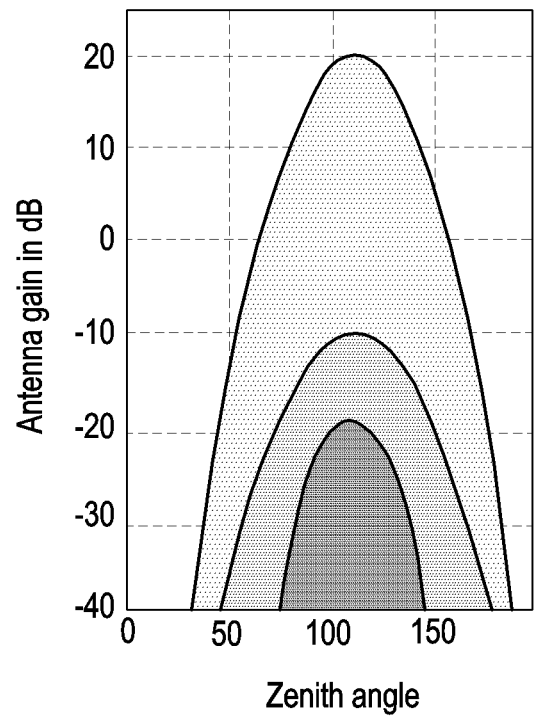
FIG. 8A illustrates a UE antenna gain pattern for receive beam index 8 in an elevation LCS, according to an embodiment.

FIG. 8A illustrates a UE antenna gain pattern for a receive beam index 8 in an elevation LCS (relative to (90, 0)), according to an embodiment.

Referring to FIG. 8A, the system uses Taylor weighting for a rectangular array with an even number of elements for obtaining a gain pattern for each beam. The system observes that amplitude and phase weighting is required to obtain practically amenable beam patterns.

Figure 8B:
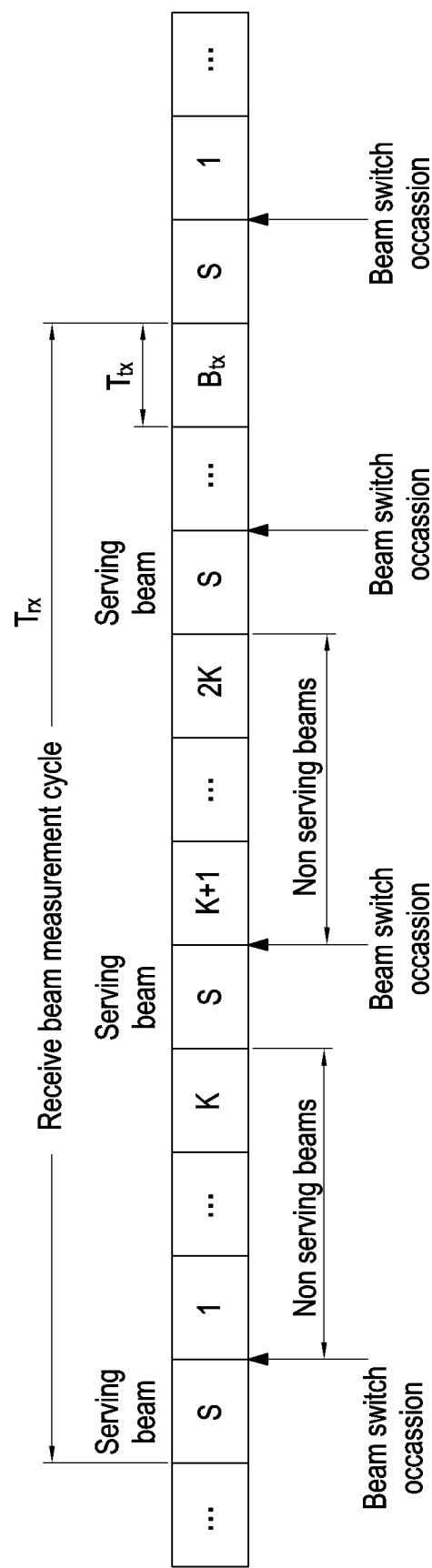
FIG. 8B illustrates a beam measurement and selection model, according to an embodiment.

FIG. 8B illustrates a beam measurement and selection model, according to an embodiment.

Referring to FIG. 8B, a reference signal from each BS transmit beam is available every $T_{tx}$ms. A UE measures all of the BS transmit beams on one of the receive beam, every $T_{tx}$ms and cycles through all the receive beams.

If S is the receive beam index selected for communication, the system assumes the measurement model below, wherein a serving receive beam is measured every (K+1) $T_{tx}$ms, interleaved between the non-serving receive beam measurements. After every serving receive beam measurement, a best receive beam is evaluated based on an observed SINR on each receive beam using the latest measurements. This scheme allows more beam switch opportunities within one full measurement cycle, $$T_{FC} = \left(\left\lceil \frac{B_{UE}}{K} \right\rceil + B_{UE}\right)T_{tx}.$$

Given the mobility requirements of the UE, this allows quicker receive beam adaptation. The system uses this method for benchmarking algorithms.

Figure 9:
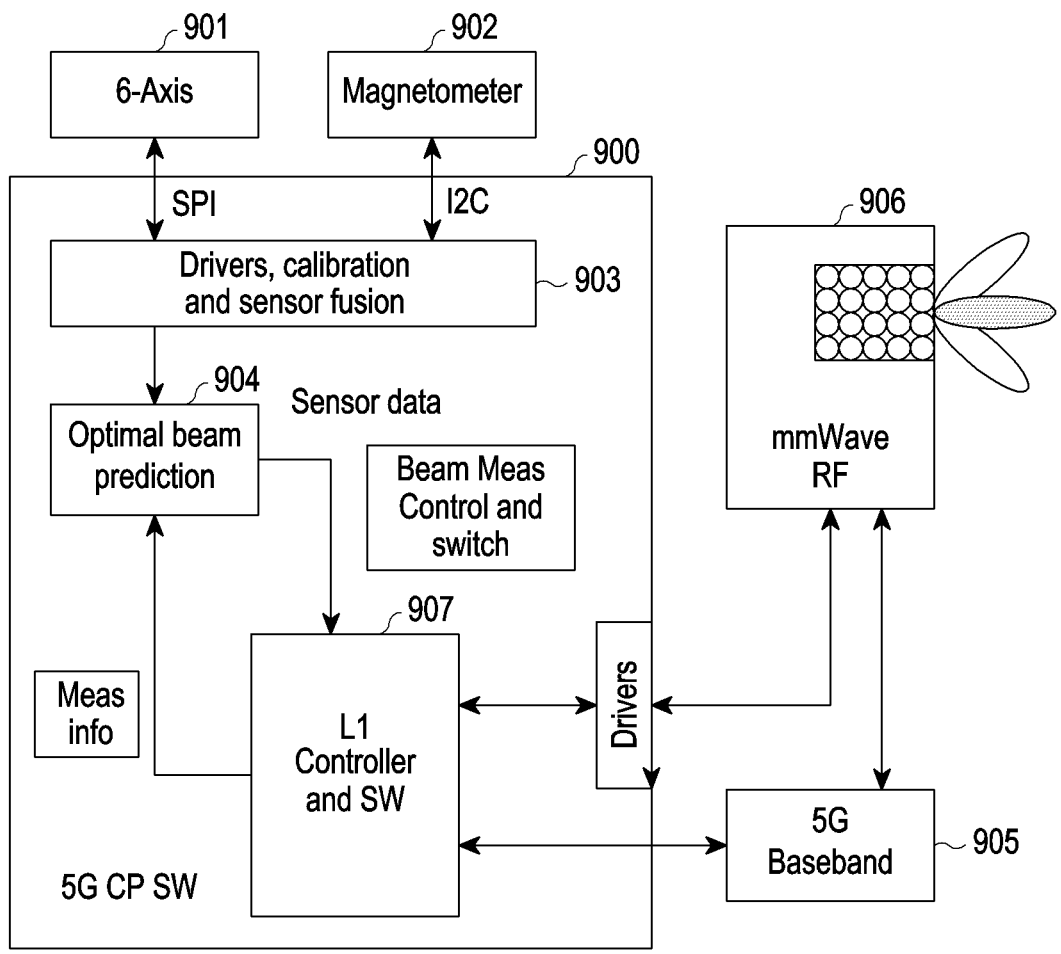
FIG. 9 illustrates a system architecture of sensor based beam tracking for 5G mmWave system, according to an embodiment.

FIG. 9 illustrates a system architecture of a sensor based beam tracking for 5G mmWave system, according to an embodiment.

Referring to FIG. 9, a 6-axis micro-electro-mechanical system (MEMS) sensor module 901 and magnetometer 902 are integrated using a serial-to-peripheral interface (SPI) and an I2C interface, respectively, with a communication processor. This direct interface of sensors with the communication processor helps in avoiding any communication delays.

The 6-Axis MEMS module 901 may include a 3-axis MEMS accelerometer and a 3-axis MEMS gyroscope. Using these sensor hardware modules, and fusion software 903 that combines magnetometer 902 output with the 6-axis sensor 901 output, device orientation is used once every $T_{update}$, which may serve as an input to an optimal beam prediction engine 904.

A main function of optimal beam prediction engine 904 is to find a subset of the receive beams for measurements, using the previous measurements and orientation data.

RF modules 906 with mmWave capabilities and 5G baseband 905 are interfaced with a 5G CP module. An L1 controller and SW module 907 on a 5G CP SW 900 control the baseband and RF hardware for obtaining periodic measurements and data communication.

Figure 10A:
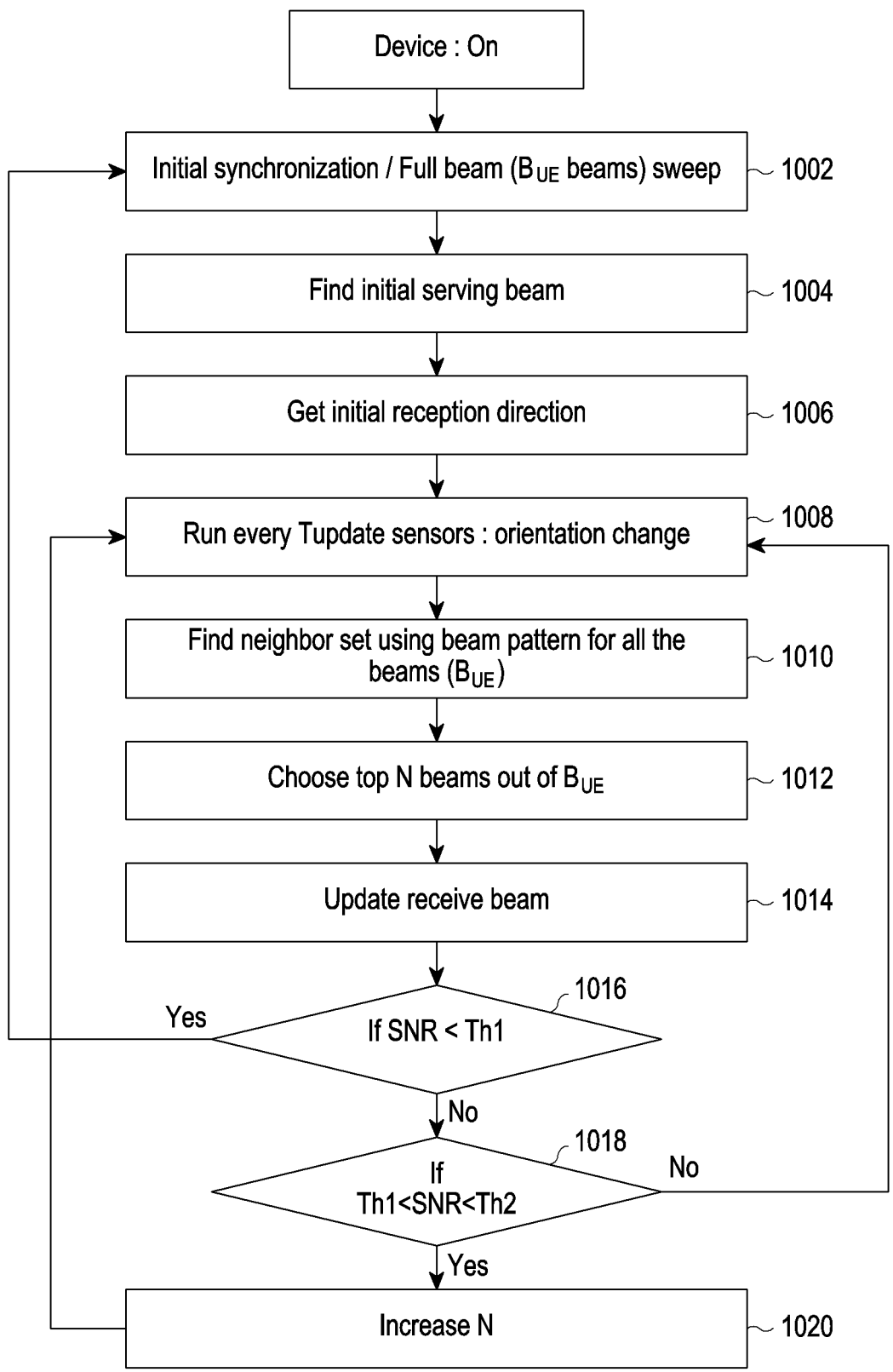
FIG. 10A is a flow chart illustrating a method for measurement set selection based on device orientation, according to an embodiment.

FIG. 10A is a flow chart illustrating a method for measurement set selection based on device orientation, according to an embodiment. For example, the method of FIG. 10A may be performed by the UE 100 illustrated in FIG. 1.

Referring to FIG. 10A, at step 1002, the UE initiates a synchronization/full beam (BUE beams) sweep. At step 1004, the UE finds an initial serving beam. At step 1006, the UE gets an initial reception direction.

At step 1008, the UE runs every $T_{update}$ sensor for orientation change.

At step 1010, the UE finds a neighbor set using a beam pattern for all of the beams (BUE).

At step 1012, the UE selects top N beams out of the BUE.

At step 1014, the UE updates the receive beam.

At step 1016, the UE compares an SNR value of the updated receive beam with a first threshold value (Th1).

If the SNR value of the updated receive beam is greater than the first threshold value, at step 1018, the UE compares the SNR value with the first threshold value and a second threshold (Th2).

If the SNR value of the updated receive beam is greater than the first threshold value and less than the second threshold value, at step 1020, the UE increases N value (i.e., a new reference beam pair) and runs every $T_{update}$ sensors.

In an embodiment, an algorithm focuses on enhancing UE performance in the scenarios with device orientation changes. Given the practical importance of this scenario and need for robustness, the system keeps the solution simple. This algorithm predicts the correct measurement set at any given time, using previous measurements and device orientation at that time, which reduces the measurement cycle drastically while increasing the agility in finding the correct receive beam with the best SNR.

The system uses device orientation data at a communication processor at a periodicity of $T_{update}$. Further, the UE has the capability to schedule the UE receive beam measurements (choosing which receive beams to be measured) at every $T_{tx}$ms (the BS transmit beam pilot periodicity), given it is UE implementation specific. The algorithm assumes the UE's knowledge of a beam pattern and beam pointing or peak direction of all the UE receive and transmit beams in the device LCS (this information is available from beam design and calibration phase).

In an embodiment, a beam selected method is evaluated in an SLS and implemented on the device. During initial network selection and for initial communication with a network, a UE searches across all possible UE beam directions to find the best UE receive beam and the BS transmit beam. Periodic updating of a serving receive beam is performed based on the beam measurements. An aspect of a method and system of the present disclosure is to reduce a UE measurement set such that beam switch decisions are more agile.

In a method for sensor-based beam management (for a UE receive beam) with measurement set optimization, UE orientation changes result in a degraded link, which mandates frequent receive beam adjustment for realigning with the BS (or gNB). The algorithm covers the aspect of the UE receive beam change. Optimization is done by limiting the measurement set size. The algorithm starts with taking the strongest beam as a reference that is searched, based on the brute force approach at the start. Based on that serving beam, the algorithm starts with the direction of signal incoming. For example, beam mapping of 25 (N) beams, as illustrated in FIG. 25, with the offset angle in azimuth and zenith considering device frame as a reference frame. Using the orientation changes, the UE searches for the best beam only in the specific set of receive beams which are nearby or suitable to that measurement set (currently 9 beams in the example below). This procedure is related to P3 procedure of 3GPP NR.

Referring to FIG. 25, if a device (e.g., a UE) is rotated in azimuth, patch (measurement set) moves in horizontal. If the device is rotated in zenith, the patch moves vertically.

Similarly, for the combination of other orientation change (yaw, pitch, and roll), a suitable patch (measurement set) may be determined after applying a rotation matrix on the current signal direction. Rotation matrix will have yaw, pitch and roll difference of the device as its component.

Figure 10B:
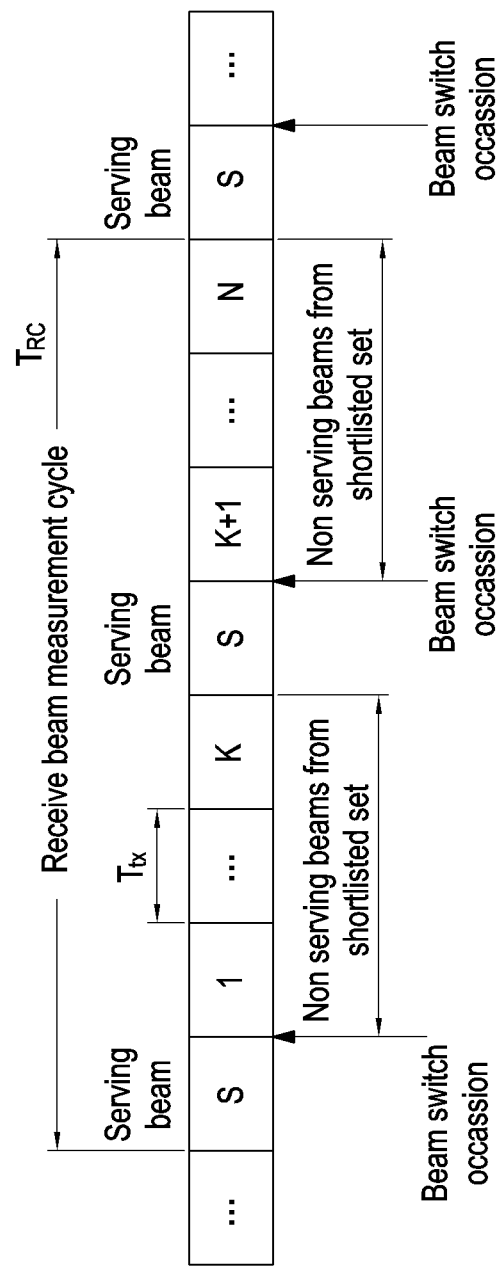
FIG. 10B illustrates measurement and beam switch occasions with a shortlisted beam set, according to an embodiment.

FIG. 10B illustrates measurement and beam switch occasions with a shortlisted beam set, according to an embodiment.

Referring to FIG. 10B, the system provides a reduced size measurement set selection, based on orientation changes. This method considers nearest neighbors with strong beam gain in the direction of signal arrival. Detailed step-by-step procedure is described in the following part of this section.

Step-1: Obtain a UE receive beam peak direction towards a strongest arrival path from a BS in the GCS at time (t−1). A beam index p represents the strongest beam based on the measurements. Obtain $b_p$=LCS2GCS (b'$_p$, O(t−1)), where b'$_p$=[θ'$_p$, ϕ'$_p$] beam peak direction in LCS is, O(t−1) is the orientation of the device at time instant (t−1).

Step-2: Obtain the beam peak direction with orientation change in the LCS at time t, with new orientation O (t) using Equation (1) below.

$$b'_p = GCS2LCS(b_p, O(t)) \quad (1)$$

A new value of orientation is obtained every $T_{update}$.

Step-3: Update the measurement set M(t).

Let the set F(t) denote the tuple with beam index and gain or metric of each beam at b'$_p$=[θ'$_p$, ϕ'$_p$], as per Equation (2).

$$F(t) = \{(G'_i(\theta'_p, \phi'_p) | i \in \{1, \ldots, B_{UE}\}\} \quad (2)$$

Let F'(t) denote the sorted list of entries in F(t), sorted in decreasing order of value of gain component of the tuple. Then the measurement set $\mathcal{M}$ (t) represents a beam index of the first N elements of ordered list F'(t). A parameter N is an input to this scheme, which depends on other conditions observed by the UE 100.

Measurement and beam switch schemes with a measurement set $\mathcal{M}$ (t) and a reduced measurement cycle, $$T_{RC} = \left(\left\lceil \frac{N}{K} \right\rceil + N\right) T_{tx},$$

obtained from the proposed algorithm are shown in FIG. 10B.

In an embodiment, the system reduces the size of measurement set from $B_{UE}$ to N. This reduced set is the prioritized set of receive beams based on the orientation and direction of signal arrival. Reduction in measurement set size reduces the time required for measuring the beams that are relevant, thereby increasing the agility of the beam adaptation.

To have control on robustness of the proposed algorithm, a value of N is adapted based on the SNR, which ensures the presence of valid beams in the measurement set, even in the scenarios with rapid SNR fluctuation. Further, the system performs periodic full receive beam measurement evaluating possible presence of new BS transmit beams. Performance gain from this method is expected in two folds; first fold, with the quicker adaptation of receive beams resulting in higher throughput, and second fold, by reducing the transmit power required by using best transmit beam (using receive-transmit reciprocity).

The system presents results covering spectral efficiency improvement in a downlink, while showing robustness of a measurement set selection and transmit power improvements. Lab results presented are limited to few specific scenarios given a limitation of test conditions in lab, while providing confirmations on gains possible with the algorithm.

In an embodiment, sensor based beam measurements (both the UE Rx and the BS Tx beams) for beam management and mobility measurements, the algorithm is described below.

Step 1: Create a table with top M beam pairs across all the beam pairs for the UE. (Initial access/periodically with period TP1>>TP2, where TP2 is the period of step 2). Procedure P-1 from the 3gpp specification.

TABLE 2

Sensor based beam measurements (Both UE Rx and BS Tx beams)

| UE(100)Rx beam id | BS(200) id (gNb id) | BS (200)Tx beam id |
|---|---|---|
| $r_1$ | $g_1$ | $t_{1g1}$ |
| $r_2$ | $g_2$ | $t_{2g2}$ |
| $r_3$ | $g_3$ | $t_{3g3}$ |
| $r_4$ | $g_4$ | $t_{4g4}$ |
| ... | | |
| $r_M$ | $g_M$ | $t_{MgM}$ |

In the Table 2:
$r_i$ is ue rx beam where i=1:M. $r_i$ and $r_j$ can be equal or different for i=1:M and j=1:M
$g_i$ is gNb id where i=1:M. $g_i$ and $g_j$ can be equal or different for i=1:M and j=1:M.
$t_{igi}$: BS Tx beam for the $i^{th}$ beam pair: beam id corresponding to BS id $g_i$.->SSB index or CSI-RS index from the 3gpp specifications.

Parameter 'M' can be chosen based on SNR and orientation change of the device.

Higher the SNR, 'M' can be lower
Lesser the change in Orientation and position, value of M can be lower.

Step 2: Decide the measurement set, as shown in the table of FIG. 26. (Do periodically with period TP2)
Choose a measurement set consisting of N beams where those N beams may include:
A.) Neighbor beams of the top 'K' beams from the table created (K=2 in FIG. 26).
B.) Based on Orientation change: Find the best Rx beam for the orientation change and choose its neighbor beams for the measurement set.

'N' and 'K' can be chosen based on SNR and based on orientation change similar to step 1. Neighbor beams can be 3, 5, 9 or a like combined in both azimuth and elevation. Here neighbor beams mean nearby beams in angular domain. Follow the procedure P-2 and P-3 (from 3gpp specifications) for this measurement set. Check for overlap cases is required.

Step 3: Updating the table illustrated in FIG. 26.
Update and reorder the list with current measurement. (based on measurement set decided in step 2)

Step 4: Beam reporting.
A.) A report based on the first row of the table.
For Serving beam indication: SSB id or csi-rs id
B.) A report based on the orientation change: find the best Rx beam using a beam tracking algorithm and report the corresponding row.
C.) A report based on the top 'K' row of the table.
For measurement set knowledge for the gNb 200 for step 2 of this algorithm.
D.) A report based on B) and C) both.
For measurement set knowledge for the gNb 200 for step 2 of this algorithm.

Figure 10C:
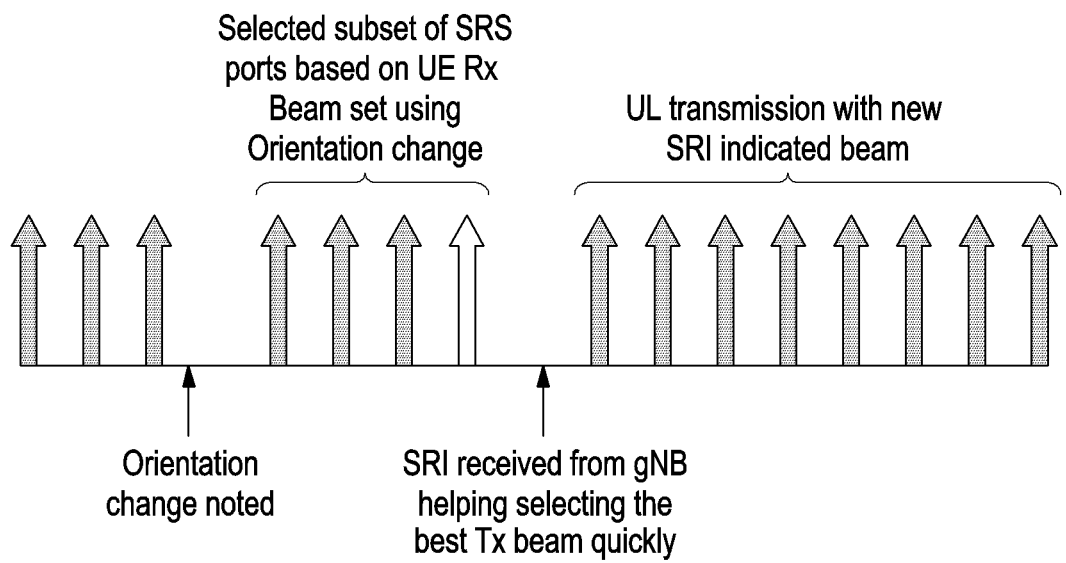
FIG. 10C illustrates sensor based beam tracking for sounding reference signal port set optimization, according to an embodiment.

FIG. 10C illustrates sensor based beam tracking for sounding reference signal port set optimization, according to an embodiment.

Referring to FIG. 10C, a system and method can use orientation change information and the UE receive beam measurements to choose the transmit beams. Instantaneous Tx beam selection showed 6-8 dB Tx power gains. This is significant power savings in typical operating conditions.

The UE Tx beam selection is decided by the gNB, which involves sending an SRS on SRS ports and waiting for the gNB to select the one of the SRS ports using set SRS configuration and SRI (the gNB sends this info to the UE on control channel).

The system and method use the UE Rx beam measurements, sensor data, and the receive beams shortlisted to select the SRS ports that are more relevant for SRS transmission, which allows the gNB to select the best beam for the UE Tx after orientation change.

Figure 10D:
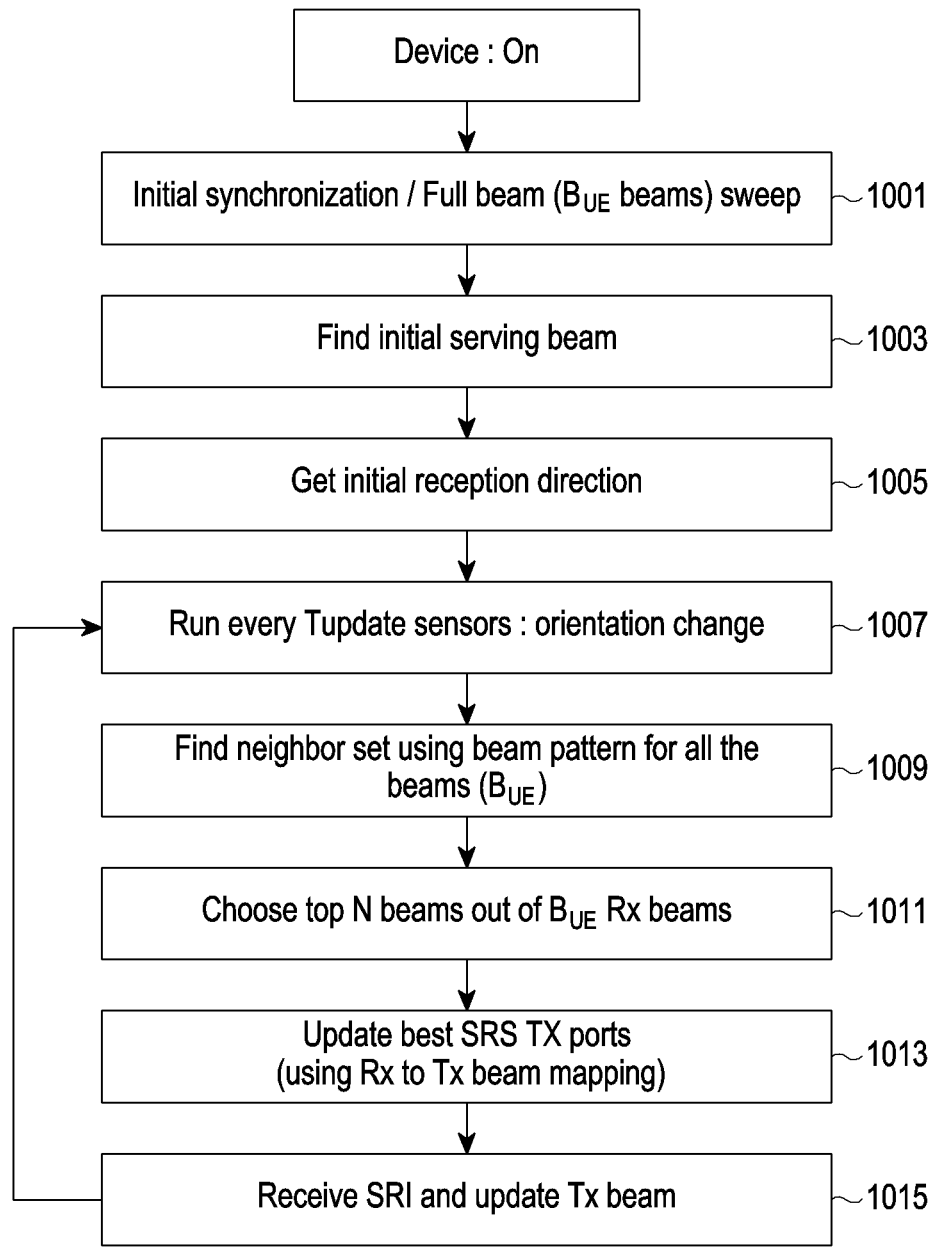
FIG. 10D is a flow chart illustrating sensor based beam tracking for sounding reference signal port set optimization, according to an embodiment.

FIG. 10D is a flow chart illustrating sensor based beam tracking for sounding reference signal port set optimization, according to an embodiment. For example, the method of FIG. 10A may be performed by the UE 100 illustrated in FIG. 1.

Referring to FIG. 10D, at step 1001, the UE initiates synchronization/full beam (BUE beams) sweep.
At step 1003, the UE finds an initial serving beam.
At step 1005, the UE gets an initial reception direction.
At step 1007, the UE runs every $T_{update}$ sensor for orientation change.
At step 1009, the UE finds a neighbor set using a beam pattern for all the beams (BUE).
At step 1011, the UE selects the top N beams out of BUE Rx beams.
At step 1013, the UE updates the best SRS Tx ports using Rx to Tx beam mapping.
At step 1015, the UE receives SRI and updates Tx beam.
Use the UE Rx beam measurements to select the ports used for SRS, which allows the gNB to choose the correct Tx beam from the UE using SRI.

Detailed step by step procedure is given below.
Step 1: Obtain the UE receive beam peak direction towards strongest arrival path from the BS in the GCS at time (t−1). Same as in receive beam selection based on orientation change.
Step 2: Obtain beam peak direction.
Obtain the beam peak direction with orientation change in LCS at time t, with new orientation O(t). Same as in receive beam selection based on orientation change.
New value of orientation is obtained every $T_{update}$.
Step 3: Update measurement set M(t)
Let the set F(t) denote the tuple with beam index and gain of each beam at $b'_p=[\theta'_p, \phi'_p]$, as per Equation (3).

$$F(t)=\{(i,G'_i(\theta'_p,\phi'_p))|i\in\{1,\ldots,B_{UE}\}\} \quad (3)$$

Let F' (t) denote the sorted list of entries in F(t), sorted in decreasing order of value of gain component of the tuple. Then measurement set M(t) represents beam index of the first N elements of ordered list F'(t). Parameter N is an input to this scheme, which depends on other conditions observed by the UE 100.
Step 4: Selection of SRS ports.

Using the mapping information from Rx beam to Tx beam, select the top few ports (N_SRS) from F'(t) as SRS ports.

Use the SRI feedback from gNB to select the Tx beam.

Figure 11:
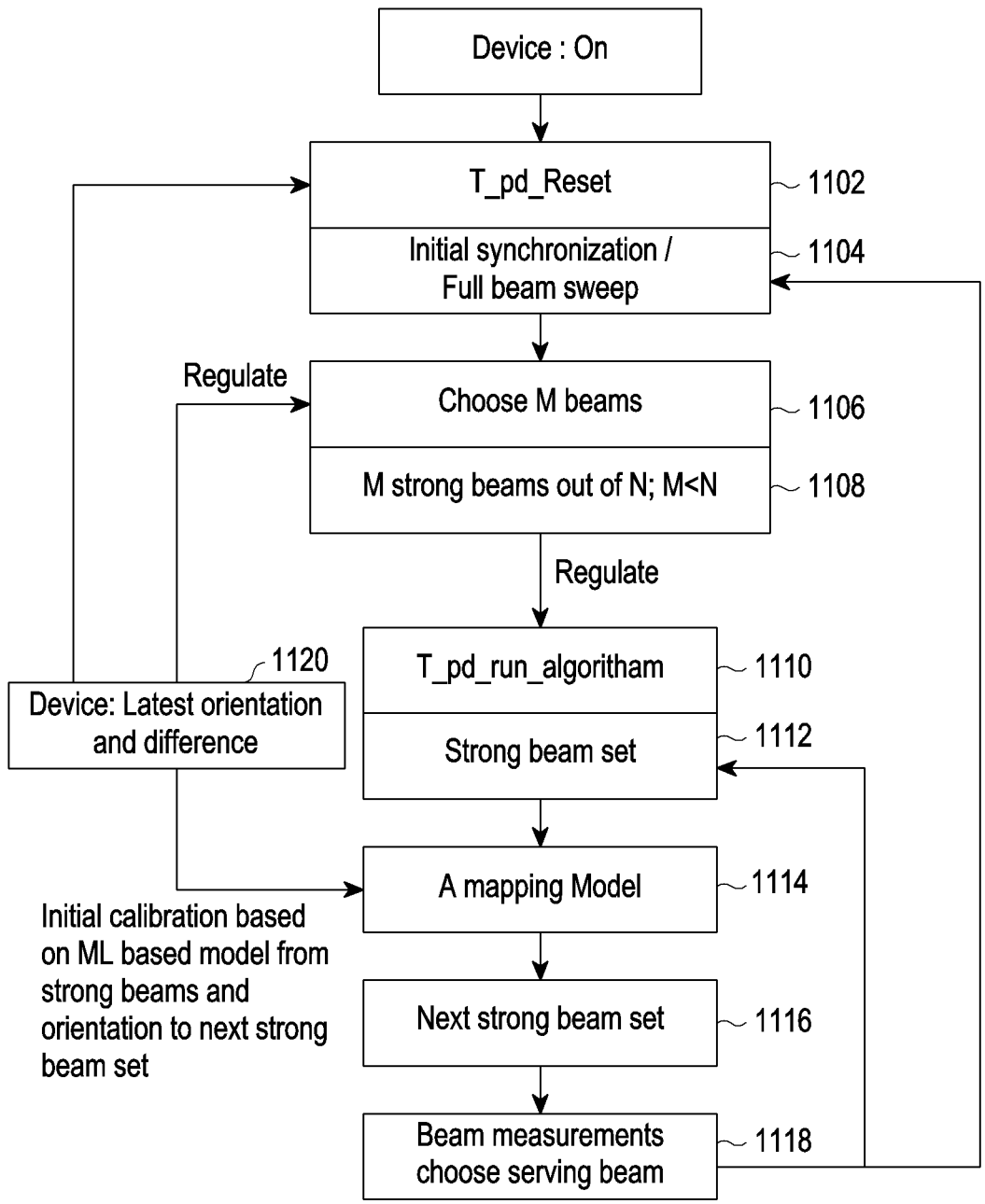
FIG. 11 is a flow chart illustrating a machine learning (ML) based approach for sensor based beam tracking, according to an embodiment.

FIG. 11 is a flow chart illustrating an ML based approach for sensor based beam tracking, according to an embodiment. For example, the method of FIG. 11 may be performed by the UE 100 illustrated in FIG. 1.

Referring to FIG. 11, at step 1102, the UE resets a T_pd (the periodicity of full beam sweep). The T_pd will be regulated by sensors and with SNR. If SNR is high, T_pd number will be high (full sweep will be needed less frequently). If SNR is low, the number will be low (full beam sweep will be needed more frequently). T_pd will be increased for a higher rate of rotation and will be decreased for a lower rate of rotation.

At step 1104, the UE performs initial synchronization and full beam sweep, obtains the beam mapping information for different azimuth and elevation angles, and forms neighborhood (adjacency matrix) map of all Rx/Tx beams for azimuth and elevation angle directions with a given resolution. This step is done once during calibration.

At steps 1106 and 1108, the UE chooses M beams out of N beams. The number M will be regulated by sensor measurements. For a higher rate of rotation choose more beams for measurement purpose.

At step 1110, the UE runs a T_pd_run periodicity algorithm. The T_pd_run algorithm will be regulated by the number 'M'. Higher the value of 'M', the T_pd_run periodicity algorithm will be higher.

At step 1112, the UE selects a strong beam set out of N beams.

At step 1114, the UE rotates the UE in all possible directions and for many environments to learn for beam mapping for the movement or rotation during initial calibration. Generic environment for the solution will be non-reflective environment.

At step 1116, the UE beam maps from the current orientation, orientation change, and current strong beam set to the next beam set by an ML based model, and predicts the next Rx/Tx beam pair and best Rx beam for the current BS Tx beam. Change Rx beam at next immediate slot boundary. If a Tx beam change is required, report Tx beam information to the BS at the next measurement update or trigger new measurement.

At step 1118, the UE chooses a serving beam by beam measurement.

At step 1120, the UE obtains differential orientation value (every period).

Figure 12A:
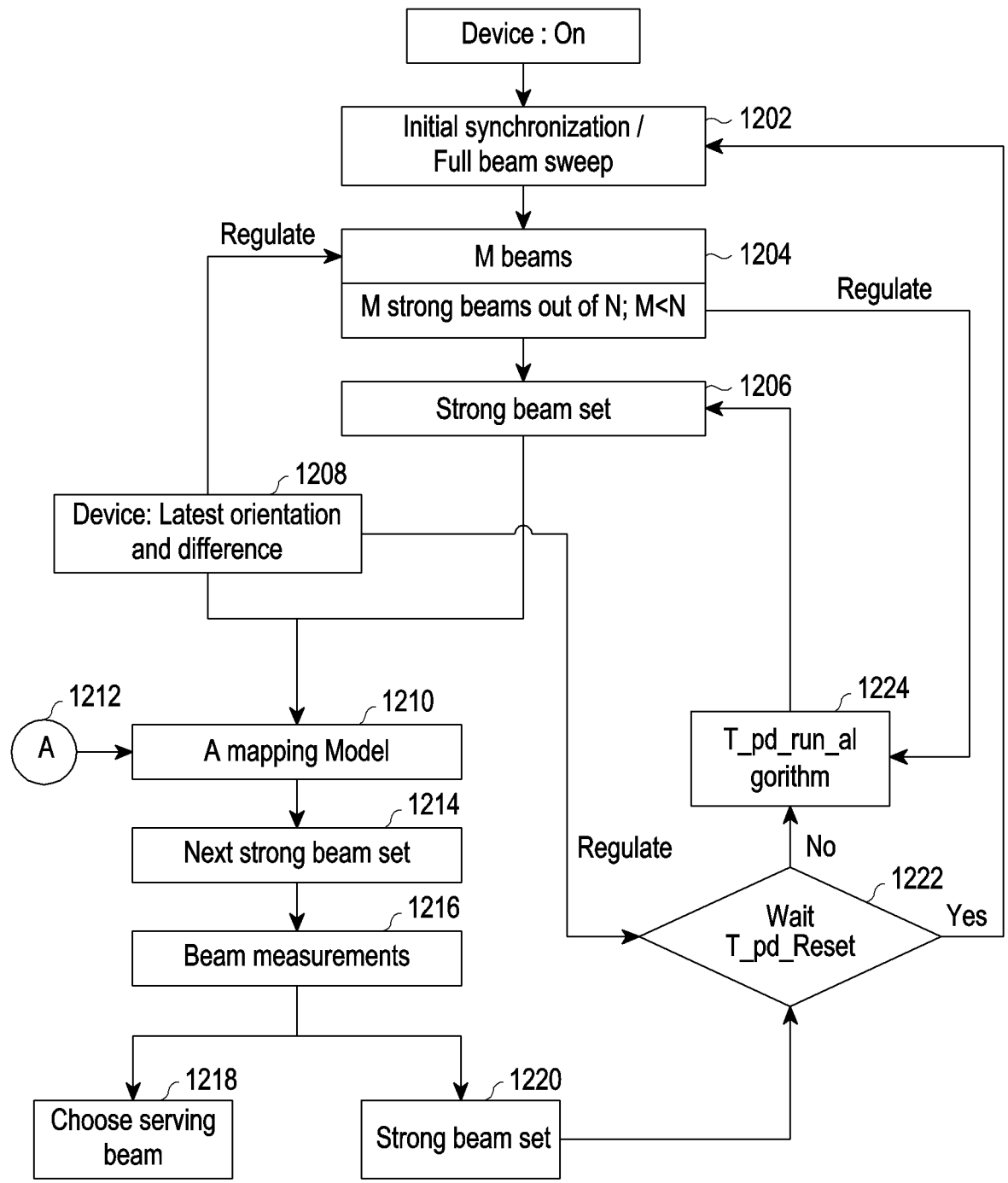
FIGS. 12A and 12B are flow charts illustrating an ML based approach with a detailed algorithm for sensor based beam tracking, according to an embodiment.
Figure 12B:
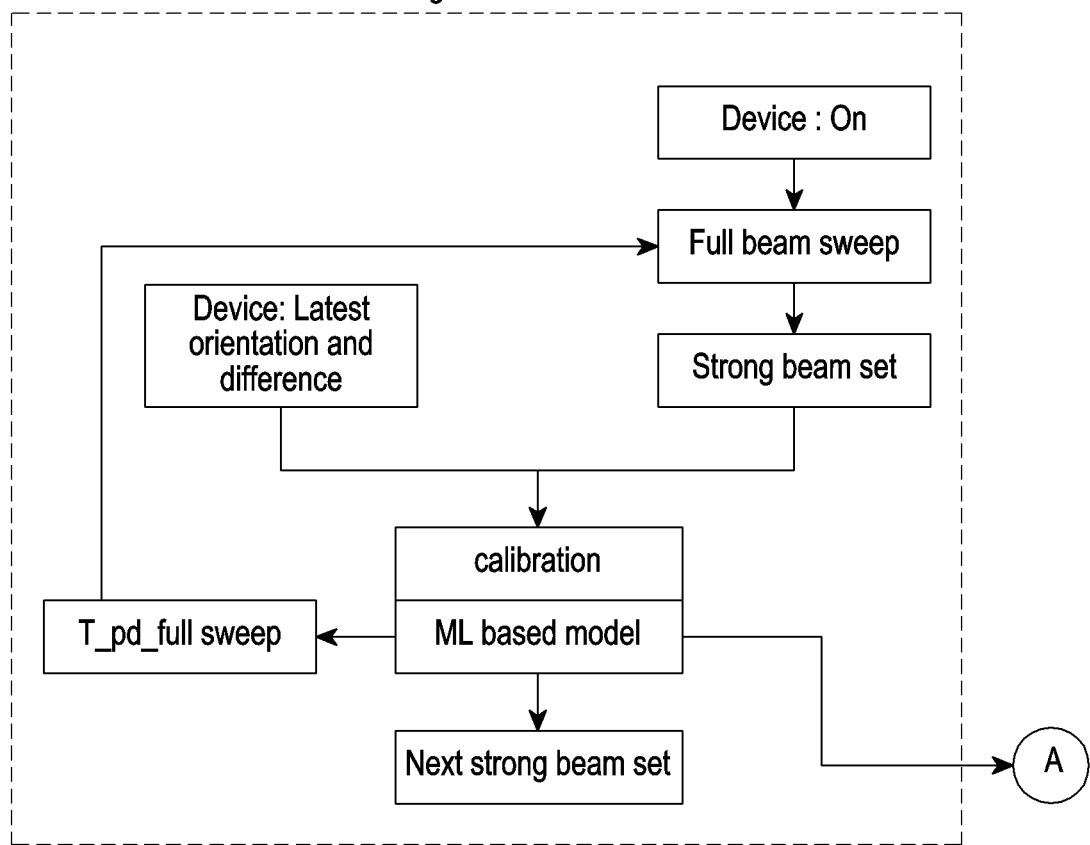

FIGS. 12A and 12B are flow charts illustrating an ML based approach with a detailed algorithm for sensor based beam tracking, according to an embodiment. For example, the method of FIGS. 12A and 12B may be performed by the UE 100 illustrated in FIG. 1.

Referring to FIG. 12A, at step 1202, the UE performs an initial synchronization and a full beam sweep, obtains the beam mapping information for different azimuth and elevation angles, and forms neighborhood (adjacency matrix) map of all Rx/Tx beams for azimuth and elevation angle directions with a given resolution.

At step 1204, the UE chooses M beams out of N beams. The number M will be regulated by sensor measurements. For a higher rate of rotation choose more beams for measurement purpose.

At step 1206, the UE selects a strong beam set out of N beams.

At step 1208, the UE obtains differential orientation value (every period).

At step 1210, the UE is rotated in all possible directions and for many environments to learn beam mapping for the movement or rotation during initial calibration.

Referring to FIG. 12B, at step 1212, the UE performs a calibration scenario as described above with reference to FIG. 11.

Referring again to FIG. 12A, at step 1214, the UE beam maps from the current orientation, orientation change, and current strong beam set to the next beam set by an ML based model, and predicts the next Rx/Tx beam pair and best Rx beam for the current BS Tx beam. Change Rx beam at next immediate slot boundary. If Tx beam change is required, report Tx beam information to the BS at the next measurement update or trigger new measurement.

At step 1216, the UE performs beam measurement.

At step 1218, the UE chooses a serving beam from a strong beam set by beam measurement.

At step 1220, the UE selects a strong beam set out of N beams.

At step 1222, the UE resets T_pd value.

At step 1224, the UE runs the T_pd_run periodicity algorithm, e.g., as described above with reference to FIGS. 10 and 11.

Figure 13:
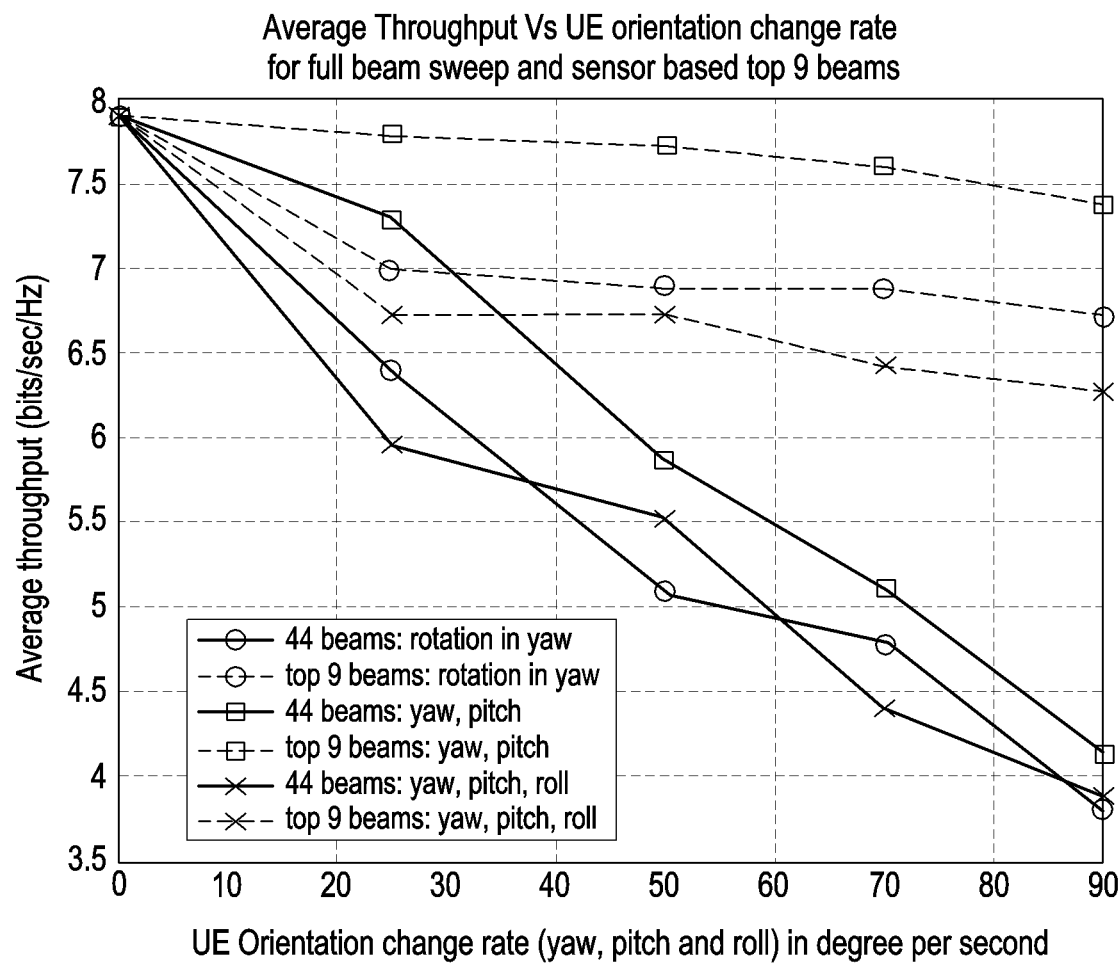
FIG. 13 illustrates a simulation result for comparison of downlink performance with different orientation change rates, according to an embodiment.

FIG. 13 illustrates a simulation result for comparison of downlink performance with different orientation change rates, according to an embodiment.

More specifically, FIG. 13 illustrates performance gain in a downlink average rate with default measurement scheme and the measurement scheme with a subset of receive beams for measurement at any given time, with a subset size of 9. A top-9 receive beam selection method has been described above with reference to FIGS. 10 to 12B. This plot compares the average spectral efficiency with different orientation change conditions, covering different orientation change rates in degree per second and different combinations of orientation changes. The system with a top-9 set for measurement outperforms the normal measurement scheme in all scenarios. Observed performance difference in yaw, (yaw and pitch), (yaw, pitch, and roll) is because of beam packing in those directions. Yaw and pitch direction has good beam coverage, hence in that direction, there is reduced loss in performance with increasing orientation change rate.

Given the mobility conditions and inevitable UE orientation change problem at mmWave bands introduce losses, methods that recover the losses are needed. This result shows the practical gains achievable in different scenarios with the proposed method.

Figure 14:
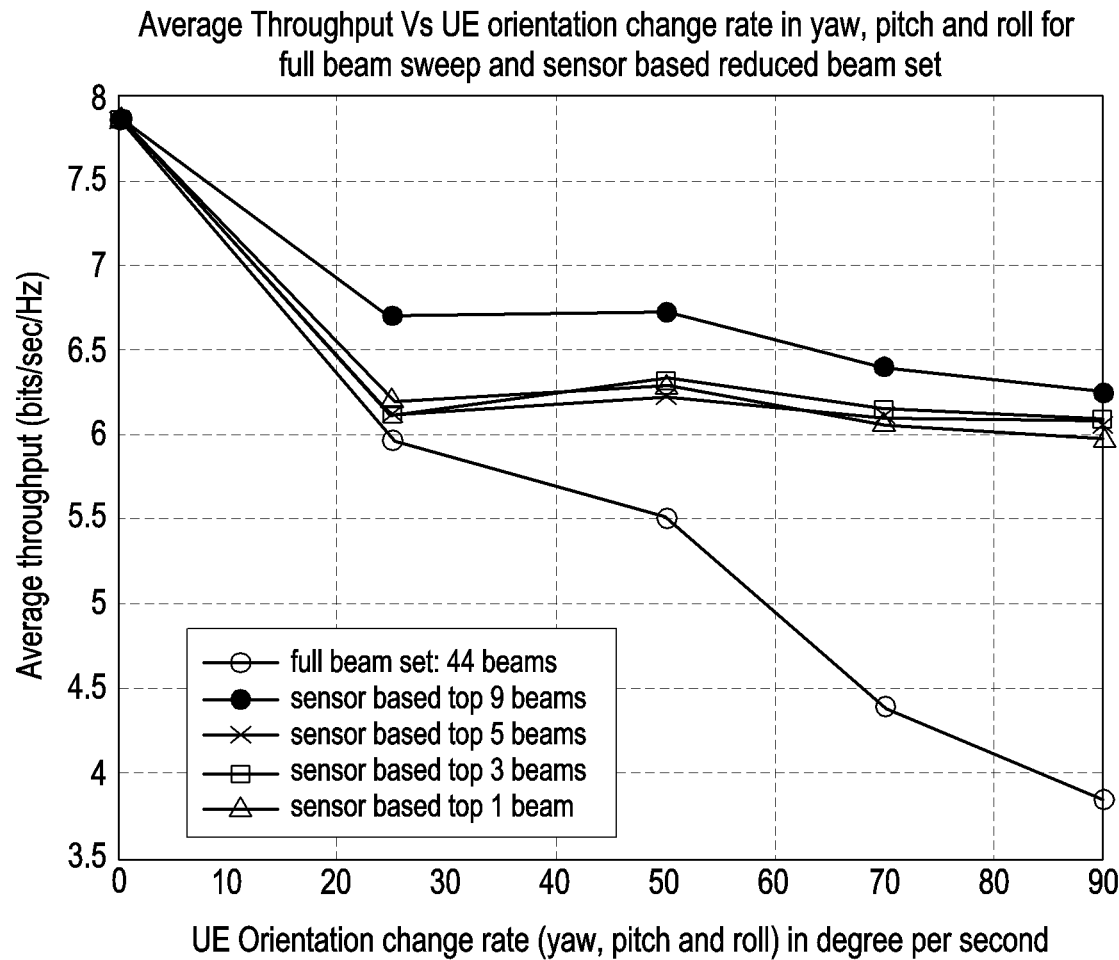
FIG. 14 illustrates a simulation result for comparison of downlink performance with different orientation change rates, according to an embodiment.

FIG. 14 illustrates a simulation result for comparison of downlink performance with different orientation change rates, according to an embodiment.

More specifically, FIG. 14 illustrates it is important for the optimization scheme to be robust in various scenarios and avoid losses in unexpected orientation change conditions, by missing the best beam from the measurement set. The system evaluated the algorithm to show the robustness.

Table 3 below shows the percentage of times the best receive beam is in the selected measurement set. This result is obtained in various orientation change rates and directions for 2000 iterations. Observe that top-N with subset size of 9 is performing as good as measuring all the receive beams in each measurement cycle (without missing a best beam). By reducing the measurement set size, there are higher chances of missing the best beam. At the same time, observe the average rate performance with different sizes to be still better than measuring full set of receive beams by a margin of 2 bits/s/Hz in average rate at 70° per sec. orientation change rate as shown in FIG. 14.

TABLE 3

Percentage times the best receive beam is within the refined measurement set over 2000 iterations of orientation change with different orientation change rates and directions with different fixed N values.

| Case | Ori. Ch. Y—Yaw P—Pitch R—Roll | Rot. In deg. | % Times best beam is with in Top-N selected set with different values of N | | | |
|---|---|---|---|---|---|---|
| | | | N = 9 | N = 5 | N = 3 | N = 1 |
| 1 | Y | 0 | 100 | 100 | 50.6 | 50.6 |
| 2 | Y | 25 | 100 | 81.5 | 57.2 | 56.5 |
| 3 | Y | 50 | 100 | 80.6 | 56.1 | 55.1 |
| 4 | Y | 70 | 100 | 80.4 | 55.1 | 53.9 |
| 5 | Y | 90 | 100 | 80.4 | 55.5 | 54.0 |
| 6 | YP | 0 | 100 | 100 | 50.6 | 50.6 |
| 7 | YP | 25 | 100 | 100 | 98.8 | 93.3 |
| 8 | YP | 50 | 100 | 98.6 | 95.4 | 91.6 |
| 9 | YP | 70 | 100 | 98.8 | 95.9 | 90.5 |
| 10 | YP | 90 | 100 | 98.3 | 94.4 | 89.4 |
| 11 | YPR | 0 | 100 | 100 | 50.6 | 50.6 |
| 12 | YPR | 25 | 100 | 72.9 | 71.5 | 70.4 |
| 13 | YPR | 50 | 100 | 75.2 | 73.2 | 71.5 |
| 14 | YPR | 70 | 100 | 74.8 | 71.5 | 68.8 |
| 15 | YPR | 90 | 100 | 76.1 | 72.9 | 70.9 |

Figure 15:
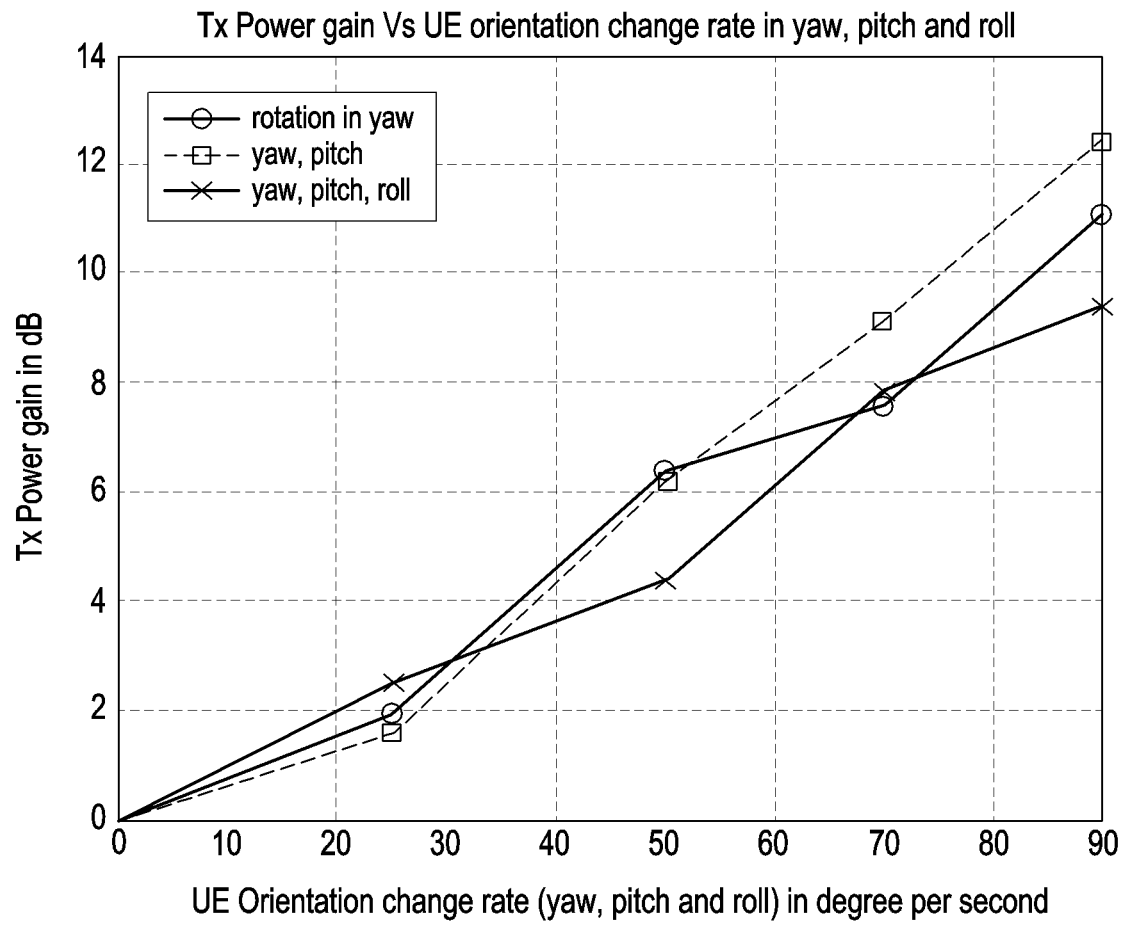
FIG. 15 illustrates a simulation result for gain in transmit power using top-9 measurement set in various orientation change scenarios relative to a default method of beam selection with 44 beam measurements, according to an embodiment.

FIG. 15 illustrates a simulation result for gain in transmit power using top-9 measurement set in various orientation change scenarios relative to a default method of beam selection with 44 beam measurements, according to an embodiment.

More specifically, FIG. 15 illustrates gain in downlink rate with ability to track quicker is shown in previous results. The same scheme is used to select the best transmit beam, assuming the transmit-receive beam reciprocity, which is a valid assumption for mmWave TDD systems. Using the method for receive beam measurements, the system chooses the best transmit beam with lesser pathloss, which help reduce the required transmit power for a given transmission scheme and target transmit power. The system observes up to 6 dB gain in transmit power (i.e., the UE can transmit 6 dB less power) on average with the proposed method of beam measurement and selection at 50° per sec orientation change rate. These gains are significant from uplink coverage view point at these bands.

Figure 16:
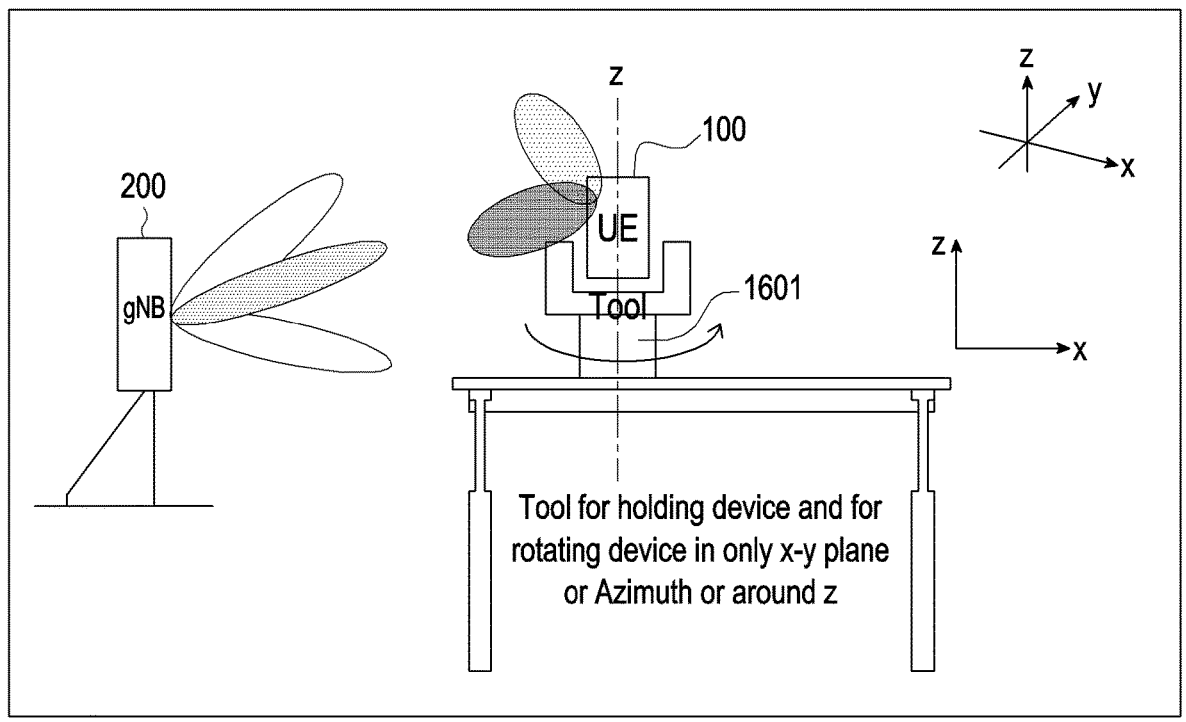
FIG. 16 illustrates a lab setup used for an algorithm evaluation with an indoor gNB and a device mounted on a rotating platform, according to an embodiment.

FIG. 16 illustrates a lab setup used for algorithm evaluation with an indoor gNB and a device mounted on a rotating platform, according to an embodiment.

Referring to FIG. 16, both the device (UE) 100 and the BS (gNB) 200 are based on pre-5G. Separation between the indoor BS 200 and the UE 100 device mounted on a rotating platform 1601 is 5 m. The UE 100 is equipped with two antenna panels, with ability to form 25 beams spanning −70° to +70° in both azimuth and elevation, relative to top view of rear panel. Further, the UE 100 device is equipped with software switch to switch between default mode of beam measurements and sensor intelligence based beam measurements. Setup with the gNB (pre-5G) 200 and the UE 100 are enabled with 8 CC carrier aggregation each CC with 100 MHz BW.

Using the setup in FIG. 16, the difference in device behavior may be obtained using observed average throughput in a few user scenarios with and without sensor based beam sweep algorithm. The scenarios presented below in Table 4 are first Jig-Jag movement of device-Continuous movement of the device between two radial directions separated by 120°, second sudden rotation-Abrupt rotation by 120°. These two scenarios are done with a rotating tool 1601 and in hand.

Multiple measurements are obtained for averaging purposes for each scenario. Table 4 shows the summary of lab test results comparing normal and sensor based beam sweep. Compared to the downlink throughput gains from SLS simulation results shown in FIG. 6, the gains in lab setup are lesser. Reason being, the difference in environment and the UE 100 capability in generating receive beams in all directions, in two setups. Pre-5G UE 100 used in the lab setup has two antenna panels generating 25 beams and only in the rear side of the device.

TABLE 4

Performance gain with Sensor based beam sweep and best beam selection algorithm over default in various rotation scenarios. Setup with 8 CC carrier aggregation

| Scenario | | Average throughput (Mbps) | |
|---|---|---|---|
| T-Tool H-Hand | Default Beam Sweep | Sensor Based Beam Sweep | % Gain |
| Jig-jag(T) | 1589 | 1794 | 13 |
| Jig-jag(H) | 1571 | 1928 | 22 |
| Sudden(T) | 1759 | 2045 | 16 |
| Sudden(H) | 1617 | 2038 | 26 |

FIG. 16 illustrates the observed throughput gain on the UE 100 device with abrupt rotation of 120° for each iteration of experiment. Sensor based beam selection approach is shown to recover quickly in abrupt orientation changes compared to default approach by a factor 3-5 (~360 ms reduces to <90 ms).

For scenario-1, Jig-jag (T) device is stationary at 60 degrees from look direction at the start for 10 sec then continuous motion (around 10-15 times in next 10 sec) between point A and point B, where point A is 60 degree from look direction (i.e., a starting point) and point B is 120 degree from look direction. Further, the motion is in azimuth from point A to Point B for last 10 sec (around 10-15 rotation). Average throughput is calculated for the last 5 second.

TABLE 5

| | Jig-jag (T) | |
|---|---|---|
| | Throughput (Mbps) | |
| Iteration | Default algorithm | Sensor based algorithm |
| 1 | 217 | 231 |
| 2 | 193 | 235 |
| 3 | 221 | 218 |
| 4 | 212 | 239 |
| 5 | 210 | 227 |
| Average | 210 | 230 |

Figure 17:
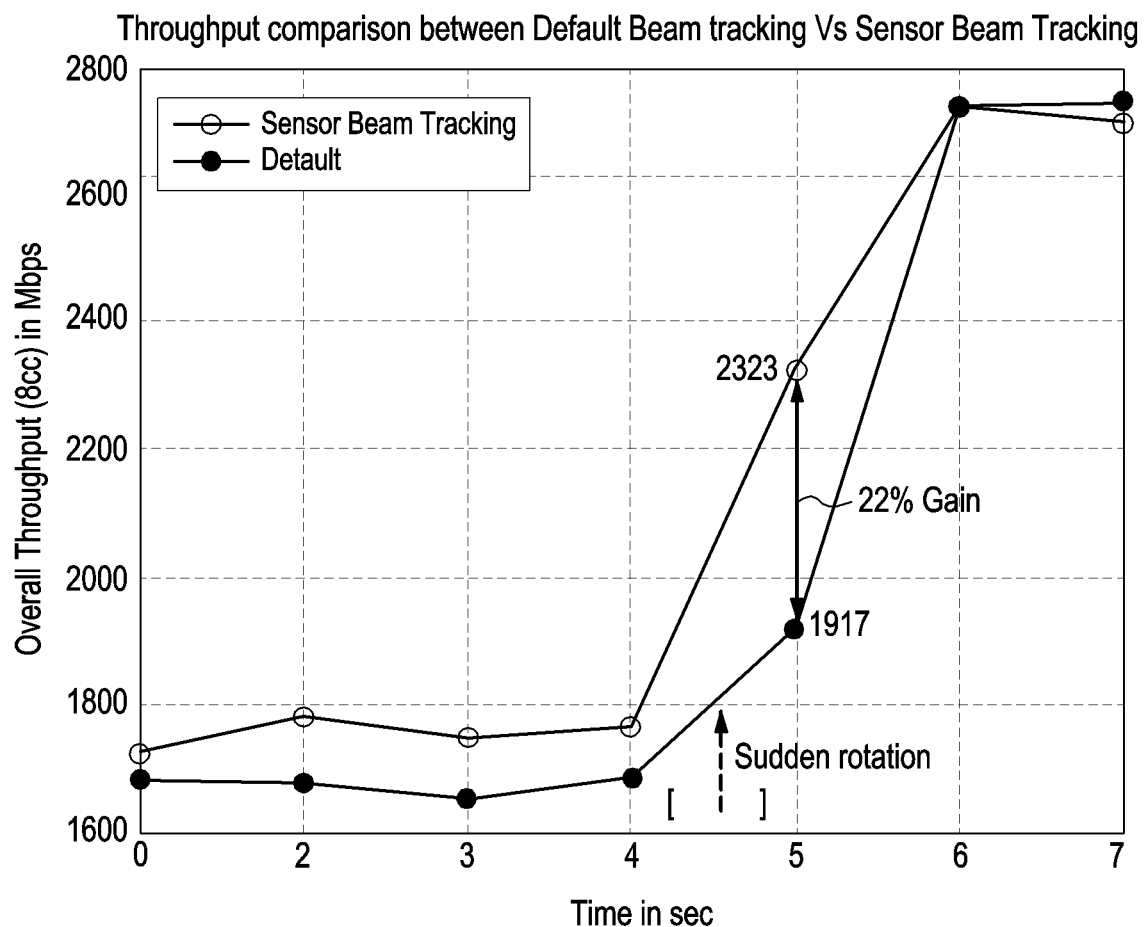
FIG. 17 illustrates a simulation result for throughput comparison with default and sensor based beam sweep algorithms for sudden rotation of a device by 120° using rotating equipment, according to an embodiment.

FIG. 17 illustrates a simulation result for throughput comparison with default and sensor based beam sweep algorithms for sudden rotation of device by 120° using rotating equipment (from low gain direction to high gain, according to an embodiment as disclosed herein).

For scenario-2, sudden rotation (T) (e.g., in Table 2). Based on lab test results for throughput comparison for normal placement with sudden rotation of the UE 100 is given in Table 6.

TABLE 6

Normal placement with sudden rotation of device

| CP Time | Default algorithm | Sensor based beam tracking |
|---|---|---|
| 05:31.4 | 156200 | 250268 |
| 05:32.4 | 220771 | 244157 |
| 05:33.4 | 188805 | 258226 |
| 05:34.4 | 207019 | 254426 |
| 05:35.4 | 194255 | 248010 |
| 05:36.4 | 179565 | 270069 |
| 05:37.4 | 179691 | 254825 |
| 05:38.4 | 249486 | 260000 |
| 05:39.4 | 245822 | 273192 |
| 05:40.4 | 239240 | 261481 |
| 05:41.4 | 232448 | 260556 |
| 05:42.4 | 245410 | 279669 |
| 05:43.4 | 297323 | 299037 |
| 05:44.4 | 297814 | 299906 |

Based on lab test results for throughput comparison for full rotation at different speed is given in Table 7.

TABLE 7

Full Rotation at different speeds

| Iteration number | Full rotation time | Avg. throughput (Mbps) default algorithm | Avg. throughput (Mbps) sensor based tracking (the proposed algorithm) |
|---|---|---|---|
| 1 | 5 s | 260 | 272 |
| 2 | 2 s | 264 | 272 |

Figure 18:
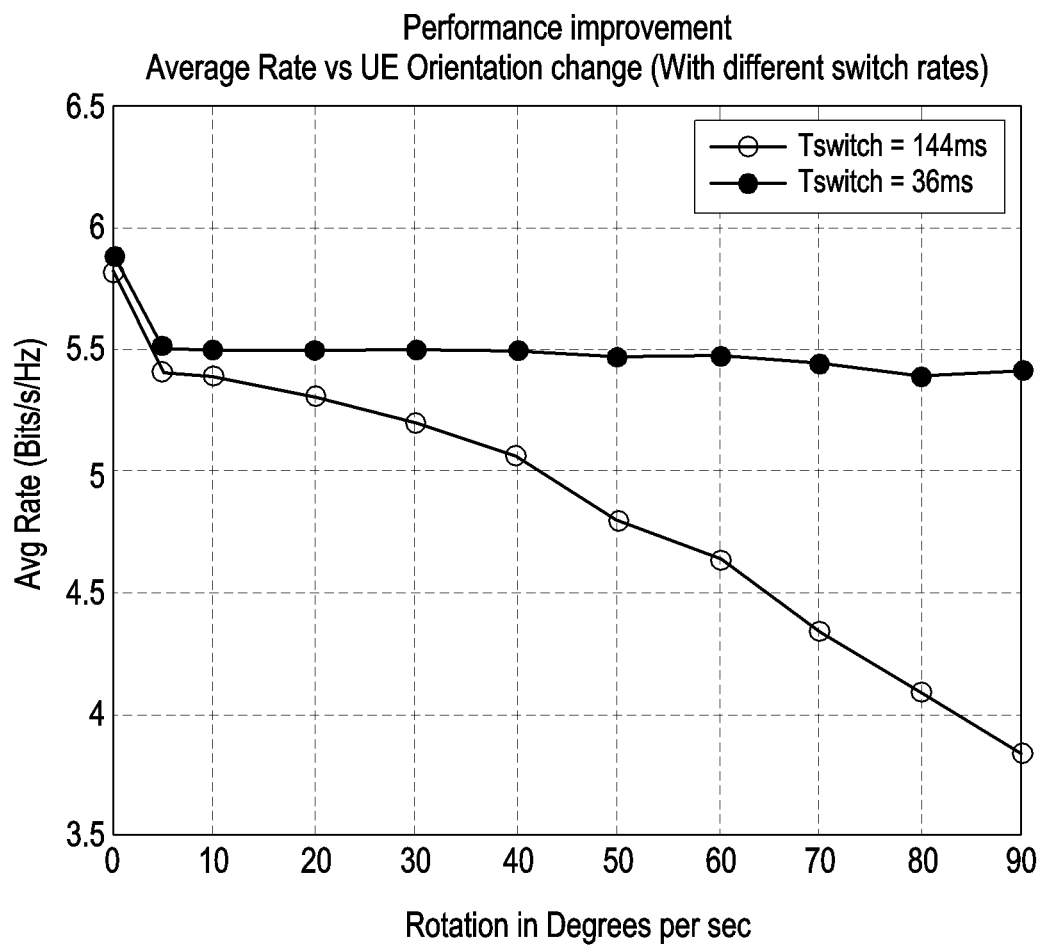
FIG. 18 illustrates a simulation result for gain with beam sweep time reduction, according to an embodiment.

FIG. 18 illustrates a simulation result for gain with beam sweep time reduction, according to an embodiment.

Referring to FIG. 18, for beam search space, assume the number of beams used at the BS is 28 and at the UE is 25. A total beam pairs to sweep is 700 (28*25). For normal beam sweep duration, as per Pre-5G standards assuming 14 beam can be measured per 5 ms. For 700 beam pair it takes 250 ms (700 beam pairs/(14 beams per 5 ms)*5 ms).

Assume multiple neighbor BS (i.e., other than the BS) to be measured. Assuming 3 neighbor BSs to be measured, beam sweep will need 750 ms. Consequently, there is throughput loss because of delay in beam measurement. As a result, the device takes 340 ms for one sweep.

To optimize beam sweep duration, an optimal Rx beam is predicted and shortlisted based on current measurements and sensor intelligence. Assume top 5 shortlisted Rx and Tx beams (5×5=25 beam pairs) to sweep. A total time required to beam measurement is 10 ms (25 beam pairs/(14 beams per 5 ms)*5 ms). Assuming 3 neighbor BSs to be measured, a beam sweep will take 10 ms. As a result, a beam sweep is optimized with improvised throughput, reduced switch time at various orientation change rates, and better beam availability.

Figure 19:
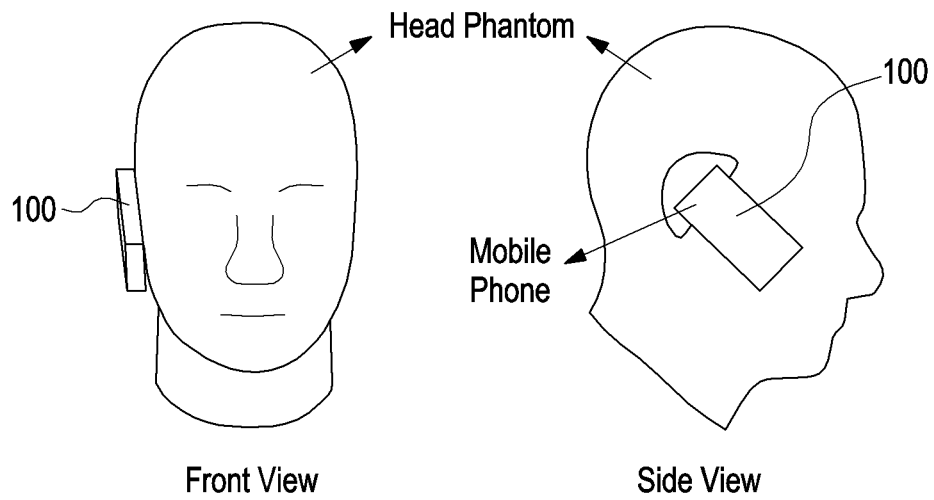
FIG. 19 illustrates an SAR and temperature control using sensor data, according to an embodiment.

FIG. 19 illustrates a SAR and temperature control using sensor data, according to an embodiment.

Referring to FIG. 19, the UE 100 obtains the holding pattern of the user and orientation of the UE 100, observed beam measurements. The measurement are used to find the best transmit beam direction to find the minimum observed SAR. Sensor data along with the device shape are used to decide the best transmit beam direction to minimize the radiation absorbed by head or body. The temperature sensors spread across the device (use a picture with uniformly spread sensors on the device) are used to find the best antenna panel location on the device to be used to avoid heating the device in one specific location. Selection of optimal receiver beam and transmit beam satisfying the SAR, heating pattern while not degrading the observed performance. Disabling the operation in a specific band (specifically mmWave), when temperature sensors spread across the device indicate the overheating and also when SAR requirements cannot be met. Enabling the operation in the specific band when SAR can be met based on device orientation, grip pattern and device shape (for flexible devices). In specific scenarios, to avoid SAR problem, find the alternate beam instead of the best beam for transmitting signal based on the device orientation with the user.

Figure 20:
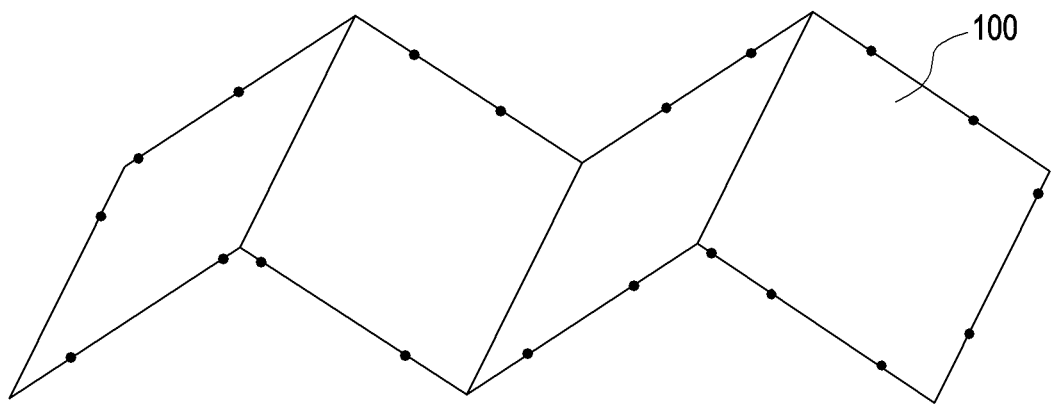
FIG. 20 illustrates flexible device-sensor based beam management, according to an embodiment.

FIG. 20 illustrates flexible device-sensor based beam management, according to an embodiment.

Referring to FIG. 20, for a flexible device (i.e., UE 100), beam management is more complicated than normal non-flexible devices. Along with sensor inputs, the system uses the shape ID (possible shapes enumerated), in deciding the best beam pair. Along with Shape ID, placement of multiple antenna panels on the device and the present measurement help find the next best beam. The method also recommends enabling and disabling of few antenna panels and modules (4G, 5G, GPS, NFC) with the help of shape ID and device orientation sensors (6-axis, Magneto) and temperature, grip and shape sensors. Usage of shape information along with grip sensors and orientation sensors are used to decide which antenna panels to be enabled/disabled to handle excessive SAR and temperature of the device.

Figure 21:
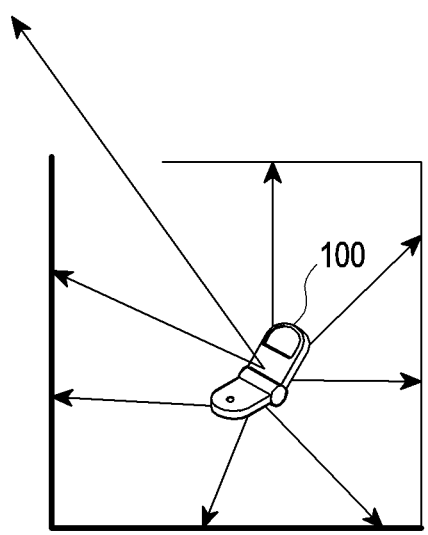
FIG. 21 illustrates an environment sensing based beam management, according to an embodiment.

FIG. 21 illustrates an environment sensing based beam management, according to an embodiment.

Referring to FIG. 21, for the device (a UE 100) in an indoor environment, best beams are expected to travel from an outdoor cell site to indoors through an opening (e.g., a window, door opening, or a glass window). Usage of distance sensor (infrared (IR) or ultrasonic or optical or mmWave transceiver) to find the obstacles in the vicinity. Distances in various directions are obtained and are tagged along with the beam measurements and orientation sensors (6-axis, Magnetometer). Distance measurements provide the details on the size of the room and possible directions of signal arrival towards the UE 100. The UE 100 uses the surroundings information in shortlisting the best beams. From the measurement, the UE 100 uses the directions which have the longest distance measurement and good receiver beam strength are shortlisted. Further, beam measurements from various BSs (i.e., other than BS) Tx beam directions are tagged along with surroundings information for shortlisting. The BS Tx beams and the UE Rx beams shortlisted using the surroundings based method can be reused if the location of the user does not change with just orientation differences. Further surroundings information is inferred from the beam measurements and corresponding angular information.

Figure 22A:
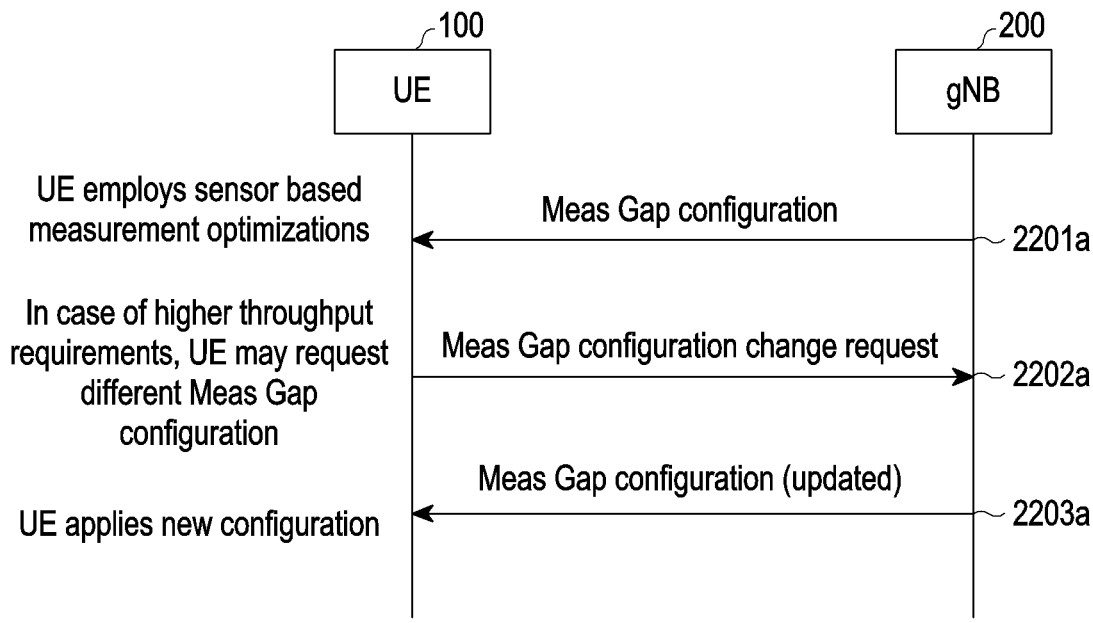
FIG. 22A is a signal flow diagram illustrating a method for beam measurements capability, according to an embodiment.

FIG. 22A is a signal flow diagram illustrating a method for beam measurement capability, according to an embodiment. In FIG. 22A, in case of higher throughput requirements, the UE 100 may request different Meas Gap configuration.

Referring to FIG. 22A, at step 2201*a*, a gNB 200 sends a Meas gap configuration to the UE 100. At step 2202*a*, the UE 100 requests a different Meas gap configuration to the gNB 200. At step 2203*a*, a gNB 200 sends an updated Meas gap configuration to the UE 100.

Figure 22B:
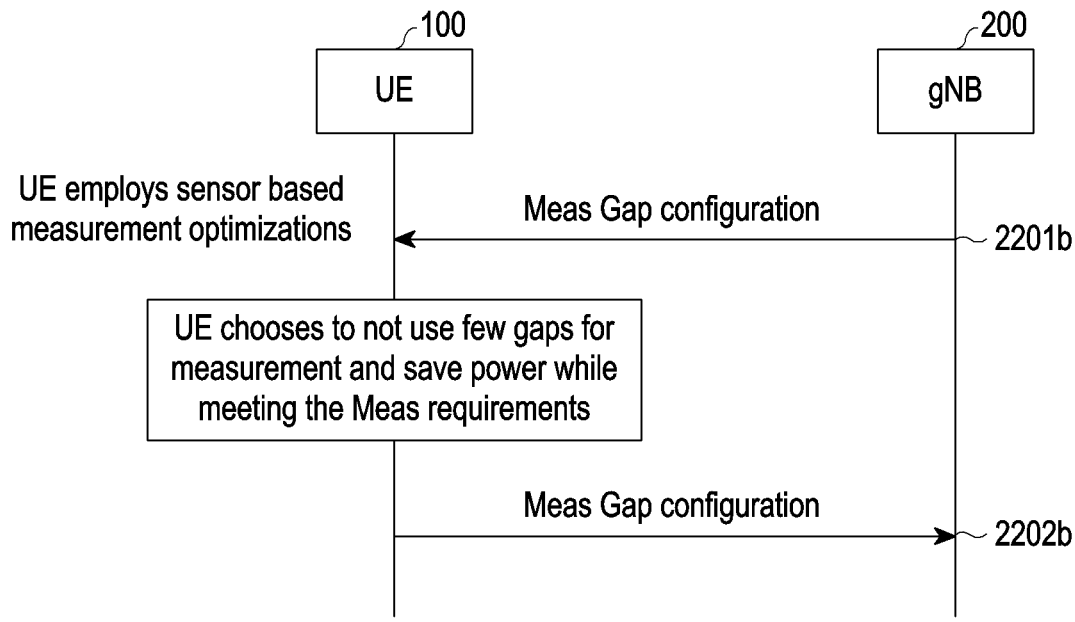
FIG. 22B is a signal flow diagram illustrating a method for beam measurements capability, according to an embodiment.

FIG. 22B is a signal flow diagram illustrating a method for beam measurement capability, according to an embodiment. In FIG. 22A, the UE 100 chooses to not use few gaps for measurement and save power while meeting the Meas requirements.

Referring to FIG. 22B, at step 2201b, a gNB 200 sends a Meas gap configuration to the UE 100. The UE 100 chooses to not use a few gaps for measurement and save power while meeting the Meas requirements. At step 2202b, the UE 100 requests a different Meas gap configuration from the gNB 200.

FIG. 22 describes, based on sensor inputs, that it is possible to sustain performance with a smaller number of measurements. Using the orientation change mapping to find the best beam indices periodically, the UE 100 may request a different measurement pattern ID in specific conditions, where the UE 100 can manage the beam measurements without frequent measurement gaps for both intra and inter-frequency measurements.

Figure 23:
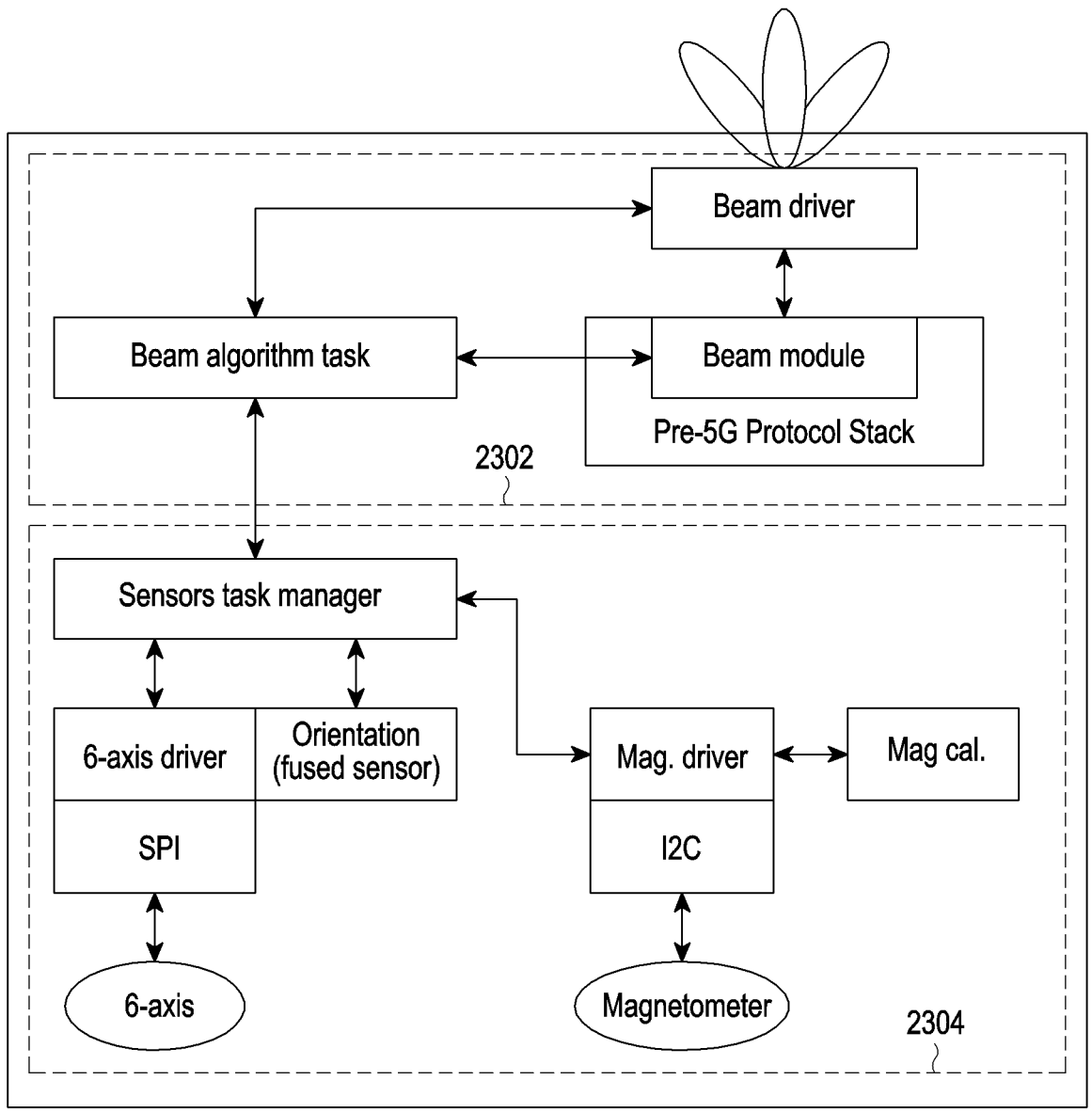
FIG. 23 illustrates mmWave beam tracking with sensor intelligence, according to an embodiment.

FIG. 23 illustrates architecture of mmWave beam tracking with sensor intelligence, according to an embodiment. More specifically, FIG. 23 describes an integration of new sensor chipsets with a processor on test HW using SPI and I2C interfaces.

Referring to FIG. 23, at step 2302, the method includes obtaining a reference beam pair, selecting a set of neighbor beam pairs of the reference beam pair, determining a reception direction of the UE based on sensor data of the UE, determining an optimal beam pair from the set of neighbor beam pairs based on the reception direction, beam measurements and configuring the optimal beam pair for communication. The method includes determining whether an SNR of the UE using the optimal beam meets an SNR criteria, and either increasing a number of neighbor beam pairs selected from the set of neighbor beam pairs based on the reference beam pair, or switching the reference beam pair to a new reference beam pair when SNR of the UE using the optimal beam does not meet the SNR criteria.

A beam algorithm task (e.g., FIG. 11 and FIG. 12B) will process measurements from L1 SW and sensor measurements to find the appropriate beam pair's SW changes to program the RFIC interface with required beam settings.

At step 2304, a sensor task manager will acquire the measurements from various sensor chipsets and apply appropriate filtering. The functionality related to the sensor task manager has already been described above with reference to FIG. 2.

Figure 24:
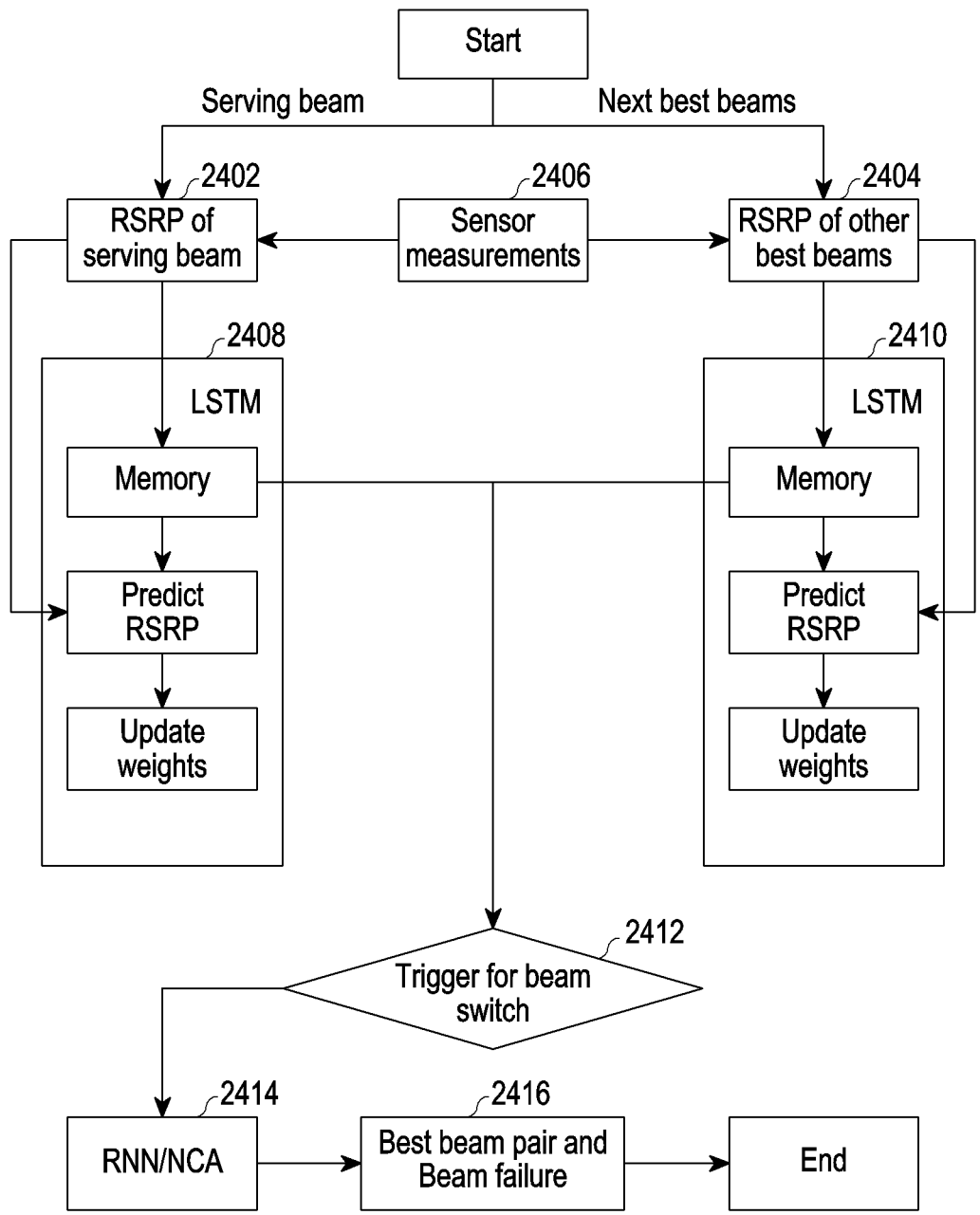
FIG. 24 is a flow chart illustrating a method for artificial intelligence (AI) aspects of beam learning and prediction, according to an embodiment.

FIG. 24 is a flow chart illustrating a method for AI aspects of beam learning and prediction, according to an embodiment.

Referring to FIG. 24, at steps 2402-2406, the system and method calculate the RSRP for serving beam and other best beam with use of sensor measurements.

At steps 2408-2410, long short term memory (LS™) is used for prediction of beam RSRP (time series) along with sensor measurements.

At step 2412, beam switch is triggered (either from sensor inputs or RSRP/SINR threshold).

At steps 2414-2416, LS™ states are fed to another NN to select the best beam pair. The same setup is extended to further indicate possible beam failure scenarios in advance. This event is used to mitigate the failure by searching for alternate beam or cell in advance.

The embodiments disclosed herein can be implemented using at least one software program running on at least one hardware device and performing network management functions to control the elements.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may, include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for sensor-based beam management by a user equipment (UE), the method comprising:
   obtaining, by the UE, a reference beam pair and a first set of neighbor beam pairs in a first reception direction for connecting with a network;
   determining, by the UE, a change in the first reception direction, based on sensor data;
   identifying, by the UE, a second set of neighbor beam pairs in the changed first reception direction;

measuring, by the UE, a plurality of beam parameters for neighbor beam pairs in the second set of neighbor beam pairs;

determining, by the UE, an optimal beam pair from the identified second set of neighbor beam pairs based on the plurality of measured beam parameters; and configuring, by the UE, an optimal beam pair for connecting with the network.

2. The method of claim 1, further comprising:

determining, by the UE, whether a signal-to-noise ratio (SNR) of the optimal beam pair is below a first SNR threshold and is above a second SNR threshold; and performing one of:
adding, by the UE, new neighboring beam pairs to the second set of neighbor beam pairs, in response to determining that the SNR of the optimal beam pair is below the first SNR threshold and is above the second SNR threshold, and switching, by the UE, the reference beam pair to a new reference beam pair by performing a beam sweep operation, in response to determining that the SNR of the optimal beam pair is below the second SNR threshold, wherein the second SNR threshold is less than the first SNR threshold.

3. The method of claim 1, wherein identifying the second set of neighbor beam pairs in the changed reception direction comprises:

periodically obtaining beam measurements of a plurality of beams from a beam measurement database; and shortlisting the second set of neighbor beam pairs for measuring the plurality of beam parameters based on the change in the first reception direction of the UE.

4. The method of claim 1, further comprising updating and reordering, by the UE, the second set of neighbor beam pairs based on beam parameters of the optimal beam.

5. The method of claim 1, wherein the sensor data indicates at least one of a change in an orientation of the UE, a grip pattern of a user of the UE, information of temperature sensors spread across the UE, a heating pattern of the UE, a shape of the UE, a configuration of antennas of the UE, and information about at least one obstacle in proximity to the UE.

6. The method of claim 1, wherein the sensor data is obtained from at least one of a 6-axis micro-electro-mechanical system (MEMS) and a magnetometer.

7. The method of claim 1, wherein the reference beam pair is determined based on at least one of a beam gain pattern and a receive beam peak direction towards a strongest arrival path from a base station in a global coordinate system (GCS) at a given time.

8. The method of claim 1, wherein determining the change in the first reception direction of the UE comprises:

obtaining the sensor data of the UE;

determining a beam peak direction in a local coordinate system (LCS) at particular time; and determining the reception direction of the UE based on the beam peak direction with orientation change in the LCS.

9. The method of claim 1, wherein the optimal beam pair satisfies a specific absorption rate (SAR), a maximum permissible exposure (MPE) threshold, and a heating pattern.

10. The method of claim 1, wherein the optimal beam is a transmit beam.

11. The method of claim 1, further comprising:

selecting, by the UE, a plurality of sounding reference signal (SRS) ports for uplink SRS transmission based on at least one of reception (Rx) beam measurements, a Rx reference direction orientation, the sensor data, and a shape configuration;

receiving, by the UE, at least one sounding reference indication (SRI); and selecting at least one SRS port based on the received SRI.

12. The method of claim 1, wherein the reference beam is a receive beam.

13. The method of claim 1, wherein the neighbor beam pair includes transmit and receive beams pairs.

14. The method of claim 1, further comprising providing, by the UE, a recommendation to regulate at least one of:

an operation in a specific band based on the optimal beam pair and the sensor data, an antenna panel based on the optimal beam pair and the sensor data, and a wireless mode based on the optimal beam pair and the sensor data.

15. A user equipment (UE) for sensor-based beam management, the UE comprising:

a memory; and a processor, operationally coupled to the memory, configured to:

obtain a reference beam pair and a first set of neighbor beam pairs in a first reception direction for connecting with a network;

determine a change in the first reception direction of the UE based on sensor data;

identify a second set of neighbor beam pairs in the changed first reception direction;

measure a plurality of beam parameters for neighbor beam pairs in the second set of neighbor beam pairs;

determine an optimal beam pair from the identified second set of neighbor beam pairs based on the plurality of measured beam parameters; and configure an optimal beam pair for connecting with the network.

16. The UE of claim 15, wherein the processor is further configured to:

determine whether a signal-to-noise ratio (SNR) of the optimal beam pair is below a first SNR threshold and is above a second SNR threshold; and perform one of:
adding new neighboring beam pairs to the second set of neighbor beam pairs, in response to determining that the SNR of the optimal beam pair is below the first SNR threshold and is above the second SNR threshold, and switching the reference beam pair to a new reference beam pair by performing a beam sweep operation, in response to determining that the SNR of the optimal beam pair is below the second SNR threshold, wherein the second SNR threshold is less than the first SNR threshold.

17. The UE of claim 15, wherein the processor is further configured to identify the second set of neighbor beam pairs in the changed reception direction by:

periodically obtaining beam measurements of a plurality of beams from a beam measurement database; and shortlisting the second set of neighbor beam pairs for measuring the plurality of beam parameters based on the change in the first reception direction of the UE.

18. The UE of claim 15, wherein the processor is further configured to update and reorder the second set of neighbor beam pairs based on beam parameters of the optimal beam.

19. The UE of claim 15, wherein the sensor data indicates at least one of a change in an orientation of the UE, a grip pattern of a user of the UE, information of temperature sensors spread across the UE, a heating pattern of the UE, a shape of the UE, a configuration of antennas of the UE, and information about at least one obstacle in proximity to the UE.

20. The UE of claim 15, wherein the sensor data is obtained from at least one of a 6-axis micro-electro-mechanical system (MEMS) and a magnetometer.

21. The UE of claim 15, wherein the reference beam pair is determined based on at least one of a beam gain pattern and a receive beam peak direction towards a strongest arrival path from a base station in a global coordinate system (GCS) at a given time.

22. The UE of claim 15, wherein the processor is further configured to determine the change in the first reception direction of the UE based on the sensor data of the UE by:
obtaining the sensor data of the UE;
determining a beam peak direction in a local coordinate system (LCS) at particular time; and
determining the reception direction of the UE based on the beam peak direction with orientation change in the LCS.

23. The UE of claim 15, wherein the optimal beam pair satisfies a specific absorption rate (SAR), a maximum permissible exposure (MPE) threshold, and a heating pattern.

24. The UE of claim 15, wherein the optimal beam is a transmit beam.

25. The UE of claim 15, wherein the processor is further configured to:
select a plurality of sounding reference signal (SRS) ports for uplink SRS transmission based on at least one of reception (Rx) beam measurements, a Rx reference direction orientation, the sensor data, and a shape configuration;
receive at least one sounding reference indication (SRI); and
select at least one SRS port based on the received SRI.

26. The UE of claim 15, wherein the reference beam is a receive beam.

27. The UE of claim 15, wherein the neighbor beam pair includes transmit and receive beams pairs.

28. The UE of claim 15, wherein the processor is further configured to provide a recommendation to regulate at least one of:
an operation in a specific band based on the optimal beam pair and the sensor data,
an antenna panel based on the optimal beam pair and the sensor data, and
a wireless mode based on the optimal beam pair and the sensor data.

* * * * *